US010196485B2

(12) United States Patent
Zhou et al.

(10) Patent No.: US 10,196,485 B2
(45) Date of Patent: Feb. 5, 2019

(54) CHEMICAL-RESISTANT THERMOPLASTIC COMPOSITIONS, ARTICLES FORMED THEREFROM, AND METHODS OF MANUFACTURE THEREOF

(71) Applicant: SABIC GLOBAL TECHNOLOGIES B.V., Bergen Op Zoom (NL)

(72) Inventors: Hao Zhou, Newburgh, IN (US); Pooja Bajaj, Schenectady, NY (US); Robert Russell Gallucci, Mt Vernon, NY (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/564,796

(22) PCT Filed: Apr. 7, 2016

(86) PCT No.: PCT/US2016/026333
§ 371 (c)(1),
(2) Date: Oct. 6, 2017

(87) PCT Pub. No.: WO2016/164518
PCT Pub. Date: Oct. 13, 2016

(65) Prior Publication Data
US 2018/0112040 A1 Apr. 26, 2018

Related U.S. Application Data

(60) Provisional application No. 62/144,041, filed on Apr. 7, 2015.

(51) Int. Cl.
| C08L 69/00 | (2006.01) |
| C08L 79/08 | (2006.01) |
| C08G 73/10 | (2006.01) |
| C08K 3/22 | (2006.01) |
| C08K 5/5313 | (2006.01) |
| C08L 51/04 | (2006.01) |
| C08L 53/02 | (2006.01) |
| C08G 64/04 | (2006.01) |
| C08G 64/16 | (2006.01) |
| C08K 5/524 | (2006.01) |

(52) U.S. Cl.
CPC ......... *C08G 73/1053* (2013.01); *C08G 64/04* (2013.01); *C08G 64/16* (2013.01); *C08K 3/22* (2013.01); *C08K 5/524* (2013.01); *C08K 5/5313* (2013.01); *C08L 51/04* (2013.01); *C08L 53/02* (2013.01); *C08L 69/00* (2013.01); *C08L 69/005* (2013.01); *C08L 79/08* (2013.01); *C08J 2300/22* (2013.01)

(58) Field of Classification Search
None
See application file for complete search history.

(56) References Cited

U.S. PATENT DOCUMENTS

| 4,387,193 | A | 6/1983 | Giles, Jr. |
| 4,404,350 | A | 9/1983 | Ryang |
| 4,548,997 | A | 10/1985 | Mellinger et al. |
| 4,629,759 | A | 12/1986 | Rock |
| 4,673,708 | A | 6/1987 | Rock et al. |
| 4,690,997 | A | 9/1987 | Cella et al. |
| 4,808,686 | A | 2/1989 | Cella et al. |
| 4,816,527 | A | 3/1989 | Rock |
| 5,051,483 | A | 9/1991 | Rock et al. |
| 5,106,915 | A | 4/1992 | Rock et al. |
| 5,387,639 | A | 2/1995 | Sybert et al. |
| 5,986,016 | A | 11/1999 | Puyenbroek et al. |
| 6,072,011 | A | 6/2000 | Hoover |
| 6,723,864 | B2 | 4/2004 | Silva et al. |
| 7,321,014 | B2 | 1/2008 | Glasgow et al. |
| 7,452,944 | B2 | 11/2008 | Gallucci et al. |
| 9,085,687 | B2 | 7/2015 | Kulkarni et al. |
| 2004/0039145 | A1 | 2/2004 | Silva et al. |
| 2007/0049706 | A1 | 3/2007 | Siripurapu et al. |
| 2007/0066737 | A1 | 3/2007 | Gallucci et al. |
| 2008/0015291 | A1 | 1/2008 | Siripurapu et al. |
| 2013/0203909 | A1 | 8/2013 | Kulkarni et al. |

(Continued)

FOREIGN PATENT DOCUMENTS

| EP | 0117327 A1 | 9/1984 |
| EP | 0186927 A2 | 12/1984 |

(Continued)

OTHER PUBLICATIONS

International Search Report for International Application No. PCT/US16/26333, International Filing Date Apr. 7, 2016, dated Jun. 20, 2016, 5 pages.
Written Opinion for International Application No. PCT/US16/26333, International Filing Date Apr. 7, 2016, dated Jun. 20, 2016, 4 pages.
International Search Report for International Application No. PCT/US2015/011031, International Application Filing Date Jan. 12, 2015; dated Mar. 24, 2015; 4 pages.
International Search Report for International Application No. PCT/US2015/011042, International Application Filing Date Jan. 12, 2015; dated Mar. 24, 2015; 4 pages.
Written Opinion for International Application No. PCT/US2015/011031, International Application Filing Date Jan. 12, 2015; dated Mar. 24, 2015, 5 pages.

(Continued)

Primary Examiner — David J Buttner
(74) Attorney, Agent, or Firm — Cantor Colburn LLP

(57) ABSTRACT

A thermoplastic composition comprises, based on the total weight of the thermoplastic composition, 3 to 20 wt. % of an impact modifier composition comprising a first impact modifier and a second impact modifier; 15 to 50 wt. % of a poly(etherimide); 5 to 60 wt. % of a polycarbonate; 5 to 20 wt. % of compatibilizer component comprising a poly (carbonate-arylate ester); up to 15 wt. % of an ultraviolet light absorbing additive; 0 to 20 wt. % of TiO2; and 0.01 to 0.5 wt. %, of an organophosphite; wherein a sample of the composition has a notched Izod impact energy of at least 200 J/m at 23° C. measured in accordance to ASTM D256.

20 Claims, 1 Drawing Sheet

(56) References Cited

U.S. PATENT DOCUMENTS

| | | |
|---|---|---|
| 2013/0224462 A1* | 8/2013 | van der Mee ......... C09K 21/14 428/220 |
| 2013/0261202 A1 | 10/2013 | Cao et al. |
| 2014/0295363 A1 | 10/2014 | Sun et al. |
| 2014/0329940 A1 | 11/2014 | Van Der Mee et al. |
| 2015/0353732 A1 | 12/2015 | Wang |
| 2016/0326366 A1* | 11/2016 | Sybert ..................... C08L 69/00 |
| 2016/0333181 A1* | 11/2016 | Sybert ..................... C08L 69/00 |

FOREIGN PATENT DOCUMENTS

| | | |
|---|---|---|
| WO | 9410245 | 5/1994 |
| WO | 2013175448 A1 | 11/2013 |
| WO | 2014072923 A1 | 5/2014 |

OTHER PUBLICATIONS

Written Opinion for International Application No. PCT/US2015/011042, International Application Filing Date Jan. 12, 2015; dated Mar. 24, 2015; 5 pages.

* cited by examiner

_(1)_

CHEMICAL-RESISTANT THERMOPLASTIC COMPOSITIONS, ARTICLES FORMED THEREFROM, AND METHODS OF MANUFACTURE THEREOF

CROSS REFERENCE TO RELATED APPLICATIONS

This application is a National Stage application of PCT/US16/26333, filed Apr. 7, 2016, which claims the benefit of U.S. Provisional Application No. 62/144,041, filed Apr. 7, 2015, both of which are incorporated by reference in their entirety herein.

BACKGROUND

This disclosure is directed to impact-modified thermoplastic compositions, articles formed therefrom, and their methods of manufacture, and in particular compatibilized thermoplastic compositions with advantageous properties such as improved impact strength, stable color, or desirable chemical resistance.

Polycarbonate homopolymers, polycarbonate copolymers, and polyetherimides are useful in a wide variety of applications at least in part because of their good balance of properties, such as moldability, heat resistance and impact properties, among others. Despite extensive research on these materials over the years, there still remains a need in the art for improved thermoplastic compositions that meet increasingly stringent industry standards.

For example, polyetherimides are known as outstanding high performance materials, having a high glass transition temperature (Tg), and high modulus and strength at elevated temperatures, good dimensional stability, as well as excellent chemical resistance. However, polyetherimides have a natural amber color with a yellowness index that can be greater than 50. This limits its colorability to dark or fairly light colors, but not to very light colors such as bright white colors. Further, the loading level of white pigment needed to achieve even fairly light color results in deterioration of mechanical properties especially poor notched-impact strength at room temperatures. Again, it is challenging to develop materials that retain the properties of polyetherimides, including chemical resistance, high flow, and high impact, but that can be manufactured as white materials without compromising these desirable properties.

SUMMARY

Disclosed herein are thermoplastic compositions comprising, based on the total weight of the thermoplastic composition, 3 to 20 wt. % of an impact modifier composition comprising a first impact modifier and a second impact modifier, preferably a core-shell acrylic rubber and a styrene-ethylene-butylene-styrene rubber; 15 to 50 wt. % of a poly(etherimide); 5 to 60 wt. % of a polycarbonate, a poly(carbonate-siloxane), or a combination comprising at least one of the foregoing; 5 to 20 wt. % of compatibilizer component comprising a poly(carbonate-arylate ester); up to 15 wt. % of an ultraviolet light absorbing additive; 0 to 20 wt. % of $TiO_2$; and 0.01 to 0.5 wt. %, of an organophosphite; wherein a sample of the composition has a notched Izod impact energy of at least 200 J/m at 23° C. measured in accordance to ASTM D256, optionally, a yield stress retention of 80% and higher after exposure of an ISO tensile bar for 24 hours to sunscreen at a temperature of 23° C. to 80° C. under 0.5% or 1% strain compared to a non-exposed reference tested according to ISO 527 at the same temperature, and optionally, an elongation at break retention of 75% and higher after exposure of an ISO tensile bar for 24 hours to sunscreen at a temperature of 23° C. to 80° C. under 0.5% or 1% strain compared to a non-exposed reference tested according to ISO 527 at the same temperature.

In another embodiment, an article selected from a molded article, a thermoformed article, an extruded sheet, an extruded fiber or filament, a printed article, a foamed article, one or more layers of a multi-layer article, a substrate for a coated article, and a substrate for a metallized article comprising the composition.

A method of manufacture of an article, comprising molding, extruding, 3-dimensional printing, or casting the composition to form the article.

The above described and other features are exemplified by the following Drawings, Detailed Description, and Examples.

BRIEF DESCRIPTION OF THE DRAWINGS

A description of the figures, which are meant to be exemplary and not limiting, is provided in which.

DETAILED DESCRIPTION

Figure 1:
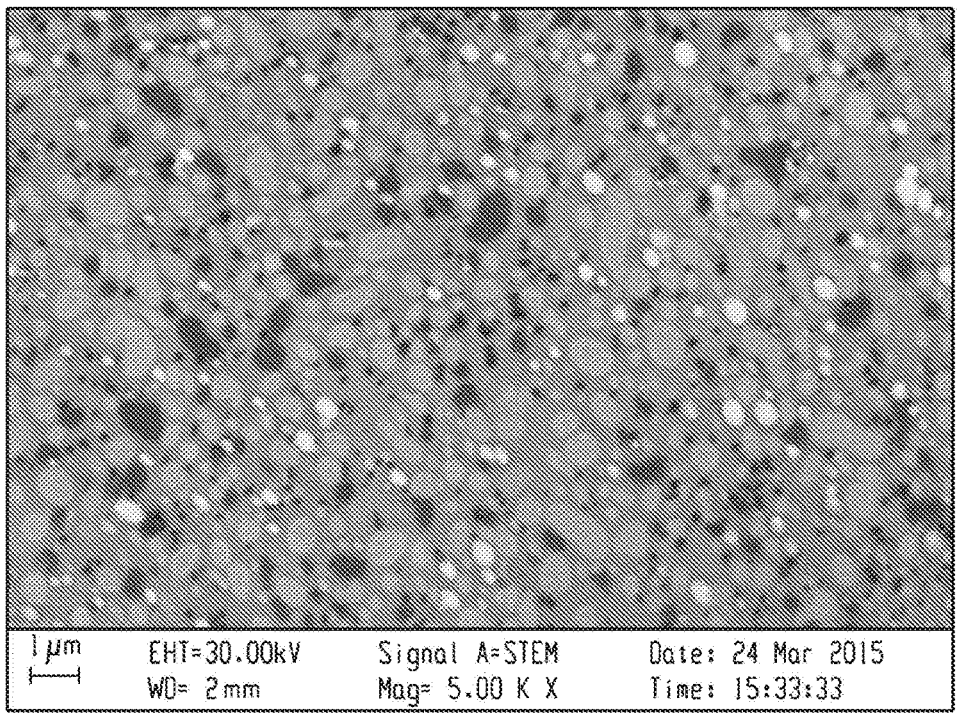
FIG. 1 shows a scanning transmission electron microscopic ("STEM") image of the composition of Example 12 at a magnification of 5,000×.
Figure 2:
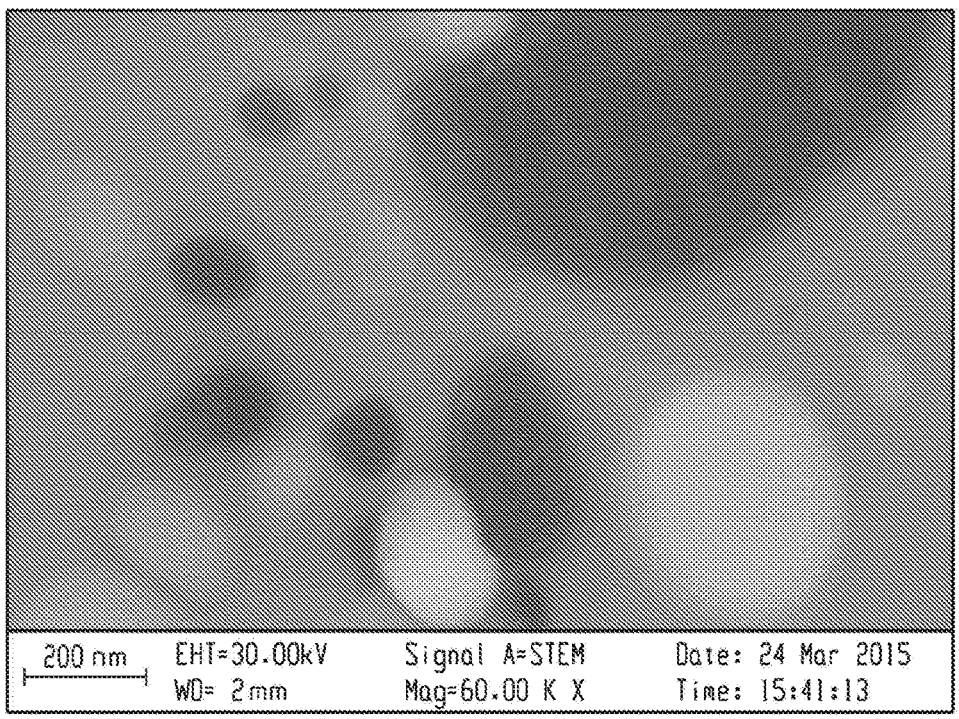
FIG. 2 shows a STEM image of the composition of Example 12 at a magnification of 60,000×.

The inventors hereof have discovered that addition of a specific modifier composition to a thermoplastic compositions that comprises a polyetherimide, a polycarbonate such as a poly(carbonate-siloxane), and a compatibilizer provides advantageous properties. The impact modifier composition includes a first impact modifier and a second impact modifier. The first and second impact modifier is different. In an embodiment, the first impact modifier is a core-shell acrylic rubber and the second modifier is a styrene-ethylene-butylene-styrene ("SEBS") rubber.

The thermoplastic compositions can have a number of advantageous properties, for example one or more of chemical resistance to harsh reagents, strength retention, UV resistance, high flow, high impact properties, very good endurance to the anodization process after exposure to harsh chemicals (such as sulfuric acid, phosphoric acid, nitric acid, acetic acid, formic acid etc.), and can also be manufactured as very light or white materials. The inventors hereof have discovered that addition of the impact modifier comprising a combination of at least two different impact modifiers unexpectedly results in these properties. Advantageously, the first and second modifier included in the impact modifier form a contiguous, but phase-separated morphology that, without being bound by specific theory, gives rise to high impact and good chemical resistance of the thermoplastic compositions herein.

These compositions are of particular utility as components for consumer electronics. The compositions can furthermore be formulated to have excellent electrical properties as described in the examples herein. The individual components of the compositions are described in more detail below.

The polyetherimide of the thermoplastic composition comprises more than 1, for example 2 to 1000, or 5 to 500, or 10 to 100 structural units of formula (1)

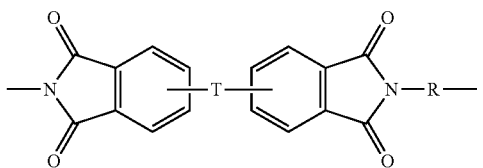

(1)

wherein each R is independently the same or different, and is a substituted or unsubstituted divalent organic group, such as a substituted or unsubstituted $C_{6-20}$ aromatic hydrocarbon group, a substituted or unsubstituted straight or branched chain $C_{2-20}$ alkylene group, a substituted or unsubstituted $C_{3-8}$ cycloalkylene group, in particular a halogenated derivative of any of the foregoing. In some embodiments R is divalent group of one or more of the following formulas (2)

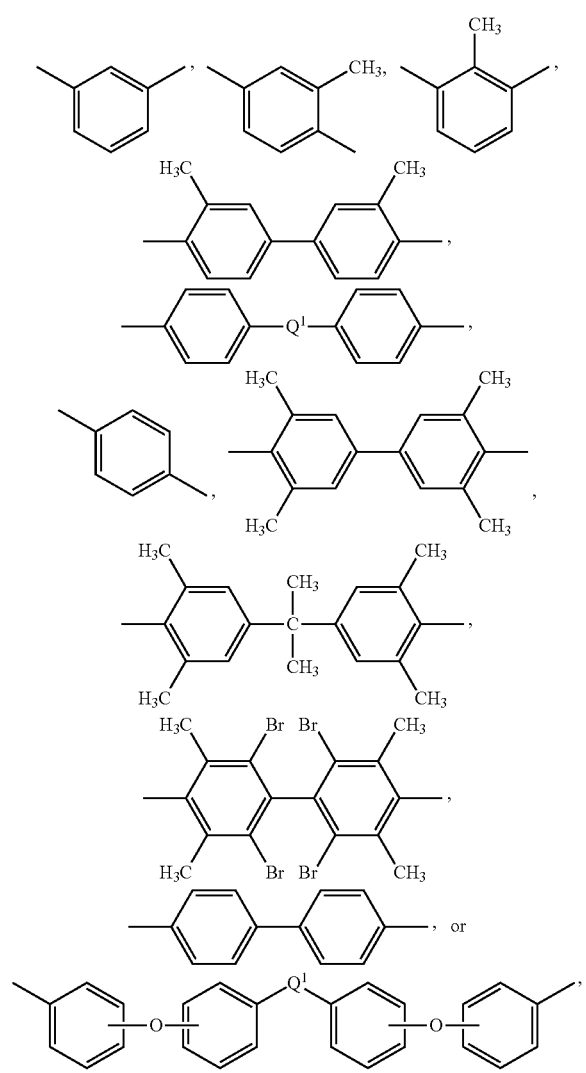

(2)

wherein $Q^1$ is —O—, —S—, —C(O)—, —SO$_2$—, —SO—, —$C_yH_{2y}$— wherein y is an integer from 1 to 5 or a halogenated derivative thereof (which includes perfluoroalkylene groups), or —$(C_6H_{10})_z$— wherein z is an integer from 1 to 4. In some embodiments R is m-phenylene, p-phenylene, or a diarylene sulfone, in particular bis(4,4'-phenylene)sulfone, bis(3,4'-phenylene)sulfone, bis(3,3'-phenylene)sulfone, or a combination comprising at least one of the foregoing.

Further in formula (1), T is —O— or a group of the formula —O—Z—O— wherein the divalent bonds of the —O— or the —O—Z—O— group are in the 3,3', 3,4', 4,3', or the 4,4' positions, and Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, provided that the valence of Z is not exceeded. Some groups Z include groups of formula (3)

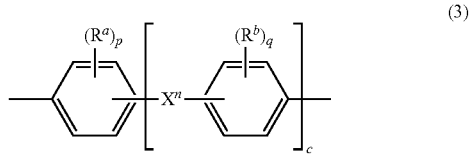

(3)

wherein $R^a$ and $R^b$ are each independently the same or different, and are a halogen atom or a monovalent $C_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. A specific example of a group Z is a divalent group of formula (3a)

(3a)

wherein Q is —O—, —S—, —SO$_2$—, —SO—, or —$C_yH_{2y}$— wherein y is an integer from 1 to 5 or a halogenated derivative thereof (including a perfluoroalkylene group). In a specific embodiment Z is a derived from bisphenol A, such that Q in formula (3a) is 2,2-isopropylidene.

In an embodiment in formula (1), R is m-phenylene, p-phenylene, or a combination comprising at least one of the foregoing, and T is —O—Z—O— wherein Z is a divalent group of formula (3a). Alternatively, R is m-phenylene, p-phenylene, or a combination comprising at least one of the foregoing, and T is —O—Z—O— wherein Z is a divalent group of formula (3a) and Q is 2,2-isopropylidene. Alternatively, the polyetherimide can be a copolymer comprising additional structural polyetherimide units of formula (1) wherein at least 50 mole percent (mol %) of the R groups are bis(3,4'-phenylene)sulfone, bis(3,3'-phenylene)sulfone, or a combination comprising at least one of the foregoing and the remaining R groups are p-phenylene, m-phenylene or a combination comprising at least one of the foregoing; and Z is 2,2-(4-phenylene)isopropylidene, i.e., a bisphenol A moiety.

In some embodiments, the polyetherimide has a GPC average molecular weight (Mw) 18,000-80,000 g/mol, a glass transition temperature (Tg) 200-250° C., less than 50 ppm amine end groups and less than 50 ppm phenolic end groups.

The thermoplastic composition can comprise 15 to 50 or 20 to 50 wt. % of the polyetherimide.

The compositions further comprise a polycarbonate, which as used herein includes homopolymers and copolymers, any of which can be linear or branched. The term "polycarbonate" thus refers to polymers or copolymers having repeating units that are bisphenol carbonate units of formula (6)

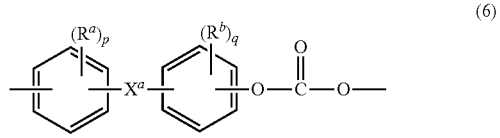

(6)

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a bridging group between the two arylene groups, and is a single bond, —O—, —S—, —S(O)—, —S(O)$_2$—, —C(O)—, a $C_{1-11}$ alkylidene of the formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group. Exemplary $X^a$ groups include methylene, ethylidene, neopentylidene, and isopropylidene. The bridging group $X^a$ and the carbonate oxygen atoms of each $C_6$ arylene group can be disposed ortho, meta, or para (specifically para) to each other on the $C_6$ arylene group. In a specific embodiment, $R^a$ and $R^b$ are each independently a methyl group, p and q are each independently 0 to 1, and $X^a$ is a single bond, a $C_{1-7}$ alkylidene of formula —C($R^c$)($R^d$)— wherein $R^c$ and $R^d$ are each independently hydrogen or $C_{1-6}$ alkyl. In an embodiment, p and q is each 1, and $R^a$ and $R^b$ are each a $C_{1-3}$ alkyl group, specifically methyl, disposed meta to the oxygen on each ring. The bisphenol carbonate units (6) can be derived from bisphenol A, where p and q are both 0 and $X^a$ is isopropylidene. The polycarbonate units can be produced from the corresponding dihydroxy compounds by methods known in the art. Some illustrative examples of dihydroxy compounds that can be used are described, for example, in WO 2013/175448 A1, US 2014/0295363, and WO 2014/072923, which also describe methods for the manufacture of polycarbonates, branching agents, and end groups.

In a specific embodiment, the polycarbonate is a linear or branched homopolymer comprising bisphenol A carbonate units. In other embodiments, the polycarbonate is a linear or branched copolymer comprising more than one type of carbonate unit. Certain polycarbonate copolymers of this type include bisphenol A units and units derived from 3,3-bis(4-hydroxyphenyl) phthalimidine, 2-phenyl-3,3'-bis (4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane, and 1,1-bis(4-hydroxy-3-methylphenyl)-3,3,5-trimethylcyclohexane (isophorone bisphenol).

In still other embodiments, the polycarbonate is a linear or branched copolymer comprising one or more than one type of carbonate units, together with another repeating unit such as an ester unit (a poly(carbonate-ester) or a polysiloxane unit (a poly(carbonate-siloxane). Poly(carbonate-siloxane) copolymers (referred to herein as "PC-siloxane" or "PC—Si") can also be used, and contain bisphenol carbonate units (6) and repeating siloxane units (also known as "diorganosiloxane units"). The siloxane units can be polysiloxane units of formula (9)

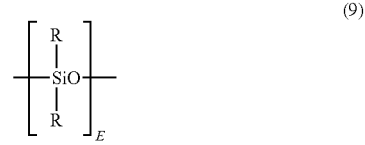

(9)

wherein each R is independently a $C_{1-13}$ monovalent hydrocarbyl group, preferably methyl, and E has an average value of 2 to 500, 2 to 200, or 5 to 120, 10 to 100, 10 to 80, 2 to 30, or 30 to 80. In an embodiment E has an average value of 16 to 50, more specifically 20 to 45, and even more specifically 25 to 45. In another embodiment, E has an average value of 4 to 50, 4 to 15, specifically 5 to 15, more specifically 6 to 15, and still more specifically 7 to 10. Poly(carbonate-siloxane) copolymers are described, for example, in WO 2013/175448. In an embodiment, the polydiorganosiloxane units are of formula (9a)

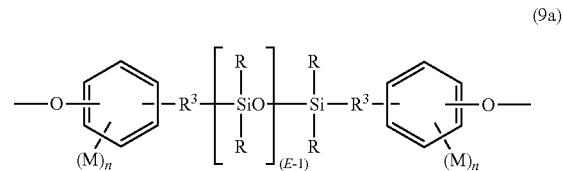

(9a)

wherein R and E are as defined for formula (9), each $R^3$ is independently a divalent $C_{2-8}$ aliphatic group, preferably dimethylene, trimethylene or tetramethylene, n is 0-4, and each M is independently bromo or chloro, $C_{1-8}$ alkyl, preferably methyl, ethyl, or propyl, an alkoxy group such as methoxy, ethoxy, or propoxy, or an aryl group such as phenyl, chlorophenyl, or tolyl. In another embodiment, R is methyl, or a combination of methyl and trifluoropropyl, or a combination of methyl and phenyl; M is methoxy, n is 0 or 1, $R^3$ is a divalent $C_{1-3}$ aliphatic group, and $R^3$ is dimethylene, trimethylene, or tetramethylene.

In a specific embodiment, the polysiloxane units are eugenol-capped polysiloxane units of formula (9b)

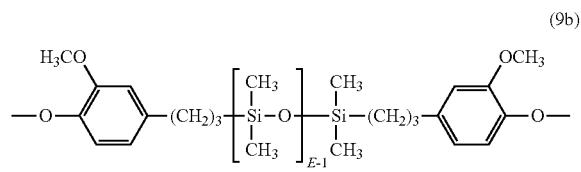

(9b)

where E has an average value as described above, specifically 2 to 200, 2 to 100, 2 to 90, 2 to 80, or 2 to 30, 20 to 20, or 30 to 80. In another specific embodiment, the polysiloxane units are of formula (9c) or (9d)

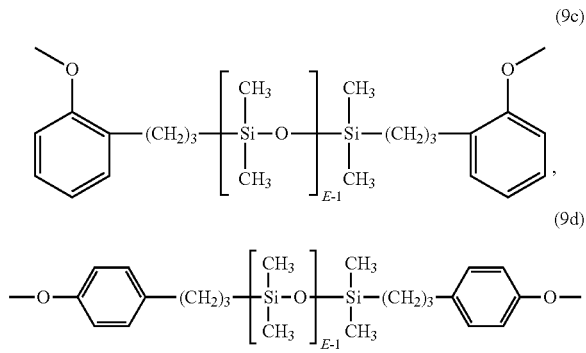

(9c)

(9d)

where E has an average value as defined above, specifically an average value of 2 to 200, 2 to 100, 2 to 90, 2 to 80, or 2 to 30, 20 to 20, or 30 to 80.

The relative amount of carbonate units (6) and polysiloxane units (9) in the PC-siloxane copolymers depends on the desired properties of the polycarbonate composition, such as impact, chemical resistance, and melt viscosity. In particular the polycarbonate copolymer is selected to have an average value of E that provides good impact and/or transparency properties, as well as to provide the desired weight percent of siloxane units in the polycarbonate composition. For example, the polycarbonate copolymers can comprise siloxane units in an amount of 0.1 to 60 weight percent (wt. %), specifically 0.5 to 55 wt. %, or 0.5 to 45 wt. %, based on the total weight of the polymers in the polycarbonate composition, with the proviso that the siloxane units are provided by polysiloxane units covalently bonded in the polymer backbone of the polycarbonate copolymer. A combination of different poly(carbonate-siloxane) can be used, including poly(carbonate-siloxane)s having different siloxane contents. The foregoing poly(carbonate-siloxane) copolymers can be manufactured by the methods described in U.S. Pat. No. 6,072,011 to Hoover, for example.

A specific poly(carbonate-siloxane) comprises carbonate units (6) derived from bisphenol A, and second repeating siloxane units (9b), wherein the siloxane units are present in an amount of 0.1 to 60 wt. %, 0.5 to 55 wt. %, 0.5 to 45 wt. % 0.5 to 30 wt. %, or 5 to 30 wt. %, based on the total weight of the poly(carbonate-siloxane), with the proviso that the siloxane units are covalently bound to the polymer backbone of the polycarbonate copolymer. This specific poly(carbonate-siloxane) has a block length of 20 to 50 dimethyl siloxane repeat units, a transition glass temperature (Tg) of 120 to 190° C., less than 10 ppm carbamate linkages and less than 100 ppm phenolic end groups. In an embodiment, the remaining units are bisphenol units (6). Transparency can be achieved in this embodiment when E has an average value of 4 to 50, 4 to 15, specifically 5 to 15, more specifically 6 to 15, and still more specifically 7 to 10. The transparent PC-siloxanes can be manufactured using one or both of the tube reactor processes described in U.S. Patent Application No. 2004/0039145A1 or the process described in U.S. Pat. No. 6,723,864 can be used to synthesize the poly(siloxane-carbonate) copolymers.

The poly(carbonate-siloxane) can have an intrinsic viscosity, as determined in chloroform at 25° C., of 0.3 to 1.5 deciliters per gram (dl/g), specifically 0.45 to 1.0 dl/g. The PC-siloxane copolymers can have a weight average molecular weight ($M_w$) of 10,000 to 100,000 g/mol, preferably 15,000-80,000 g/mol, as measured by gel permeation chromatography (GPC) using a cross linked styrene-divinyl benzene column, at a sample concentration of 1 milligram per milliliter, and as calibrated with polycarbonate standards.

The thermoplastic compositions can include 5 to 60 wt. % of the polycarbonate, preferably the poly(carbonate-siloxane), preferably 10 to 50 wt. %, or 20 to 50 wt. % of the polycarbonate, preferably the poly(carbonate-siloxane), each based on total weight of the thermoplastic composition.

The thermoplastic composition comprises a compatibilizer component selected from a poly(carbonate-arylate ester). A poly(carbonate-arylate ester) comprises repeating bisphenol carbonate units (6) and repeating arylate ester units of formula (10)

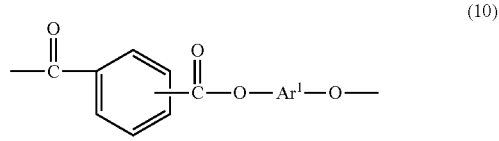

(10)

wherein $Ar^1$ is a $C_{6-32}$ hydrocarbyl group containing at least one aromatic group, e.g., a phenyl, naphthalene, anthracene, or the like. In an embodiment, $Ar^1$ is derived from an aromatic bisphenol, a monoaryl dihydroxy compound, or a combination comprising different bisphenol or monoaryl dihydroxy compounds. Thus, arylate ester units (10) can be derived by reaction of isophthalic acid, terephthalic acid, or a combination comprising at least one of the foregoing (referred to herein as a "phthalic acid"), with an aromatic bisphenol such as bisphenol A, a monoaryl dihydroxy compound such as resorcinol, or a combination comprising at least one of the foregoing. The molar ratio of isophthalate to terephthalate can be 1:99 to 99:1, or 80:20 to 20:80, or 60:40 to 40:60.

The poly(carbonate-arylate ester) comprising first bisphenol carbonate units (6) and arylate ester units (10) can be alternating or block copolymers of formula (11)

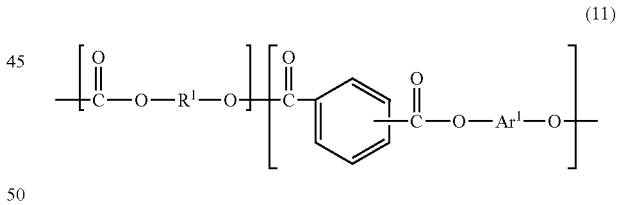

(11)

wherein $R^1$ and $Ar^1$ are as defined in formulae (6) and (10), respectively.

In general, the copolymers are block copolymers containing carbonate blocks and ester blocks. The weight ratio of total ester units to total carbonate units in the copolymers can vary broadly, for example from 99:1 to 1:99, or from 95:5 to 5:95, specifically from 90:10 to 10:90, or more specifically from 90:10 to 50:50, depending on the desired properties of the polycarbonate composition. The molar ratio of isophthalate to terephthalate in the ester units of the copolymers can also vary broadly, for example from 0:100 to 100:0, or from 92:8 to 8:92, more specifically from 98:2 to 45:55, depending on the desired properties of the polycarbonate composition. For example, the weight ratio of total ester units to total carbonate can be 99:1 to 40:60, or 90:10 to 50:40, wherein the molar ratio of isophthalate to terephthalate is from 99:1 to 40:50, more specifically 98:2 to 45:55, depending on the desired properties of the polycarbonate composition.

Additional carbonate units derived from the dihydroxy compound used to form the arylate ester units (10) can also be present as described above, for example in amounts of less than 20 mole %, less than 10 mole %, or less than 5 mole %, based on the total moles of units in the polycarbonate copolymer. It is also possible to have additional arylate ester units present derived from reaction of the phthalic acid with the dihydroxy compound used to form the carbonate units, for example in amounts of less than 20 mole %, less than 10 mole %, less than 5 mole %, or less than 1 mole % based on the total moles of units in the copolymer. In an embodiment, the combination of such additional carbonate units and additional arylate ester units are present in an amount of less than 20 mole %, less than 10 mole %, less than 5 mole %, or less than 1 mole % based on the total moles of units in the copolymer.

A specific poly(carbonate-arylate ester) is a poly(carbonate)-co-(bisphenol arylate ester) comprising carbonate units (6), specifically bisphenol carbonate units, even more specifically bisphenol A carbonate units and repeating bisphenol arylate ester units. Bisphenol arylate units comprise residues of phthalic acid and a bisphenol, for example a bisphenol (6). In an embodiment the bisphenol arylate ester units are of formula (10a)

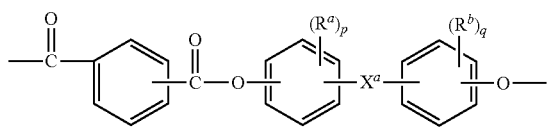

(10a)

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a bridging group between the two arylene groups, and is a single bond, —O—, —S—, —S(O)$_2$—, —C(O)—, a $C_{1-11}$ alkylidene of the formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group. In an embodiment, p and q is each 0 or 1, and $R^a$ and $R^b$ are each a $C_{1-3}$ alkyl group, specifically methyl, disposed meta to the oxygen on each ring, and $X^a$ is an alkylidene of the formula —C($R^c$)($R^d$)— wherein $R^c$ and $R^d$ are each $C_{1-6}$ alkyl. The bisphenol can be bisphenol A, where p and q are both 0 and $X^a$ is isopropylidene.

In a specific embodiment, the poly(carbonate-arylate ester) is a poly(bisphenol A carbonate)-co-(bisphenol A-phthalate-ester) of formula (11a)

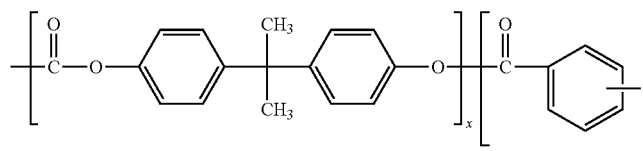

(11a)

wherein y and x represent the weight percent of arylate-bisphenol A ester units and bisphenol A carbonate units, respectively. Generally, the units are present as blocks. In an embodiment, the weight percent of ester units y to carbonate units x in the copolymers is 50:50 to 99:1, or 55:45 to 90:10, or 75:25 to 95:5. Copolymers of formula (11a) comprising 35 to 45 wt. % of carbonate units and 55 to 65 wt. % of ester units, wherein the ester units have a molar ratio of isophthalate to terephthalate of 45:55 to 55:45 are often referred to as poly(carbonate-ester)s (PCE), and copolymers comprising 15 to 25 wt. % of carbonate units and 75 to 85 wt. % of ester units having a molar ratio of isophthalate to terephthalate from 98:2 to 88:12 are often referred to as poly(phthalate-carbonate)s (PPC).

In another embodiment, a specific poly(carbonate-arylate ester) is a poly(carbonate)-co-(monoaryl arylate ester) containing carbonate units (6) and repeating monoaryl arylate ester units of formula (10b)

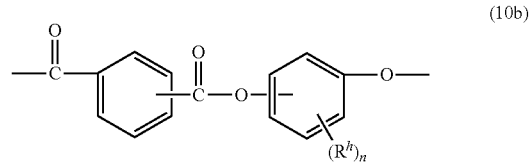

(10b)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. Specifically, each $R^h$ is independently a $C_{1-4}$ alkyl, and n is 0 to 3, 0 to 1, or 0. These poly(carbonate)-co-(monoaryl arylate ester) copolymers are of formula (11b)

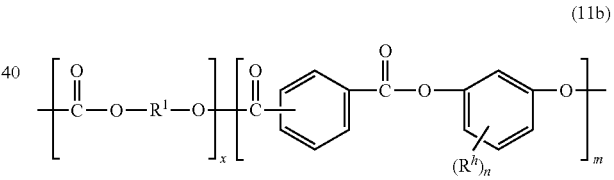

(11b)

wherein $R^1$ is as defined in formula (7) and $R^h$, and n are as defined in formula (10b), and the mole ratio of x:m is 99:1 to 1:99, specifically 80:20 to 20:80, or 60:40 to 40:60.

Specifically, the monoaryl-arylate ester unit (10b) is derived from the reaction of a combination of isophthalic and terephthalic diacids (or derivatives thereof) with resorcinol (or reactive derivatives thereof) to provide isophthalate-terephthalate-resorcinol ("ITR" ester units) of formula (10c)

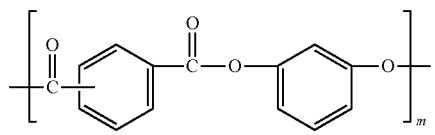

(10c)

wherein m is 4 to 100, 4 to 90, 5 to 70, more specifically 5 to 50, or still more specifically 10 to 30. In an embodiment, the ITR ester units are present in the polycarbonate copolymer in an amount greater than or equal to 95 mol %, specifically greater than or equal to 99 mol %, and still more specifically greater than or equal to 99.5 mol % based on the total moles of ester units in the copolymer. Such (isophthalate-terephthalate-resorcinol)-carbonate copolymers ("ITR-PC") can possess many desired features, including toughness, transparency, and weatherability. ITR-PC copolymers can also have desirable thermal flow properties. In addition, ITR-PC copolymers can be readily manufactured on a commercial scale using interfacial polymerization techniques, which allow synthetic flexibility and composition specificity in the synthesis of the ITR-PC copolymers.

In an embodiment, the ITR-PC copolymer, i.e., the compatibilizer polycarbonate component, includes greater than 60% resorcinol derived ester linkages, has a GPC average molecular weight Mw of 15,000 to 80,000 g/mol, a Tg of 120 to 190° C., and an isophthalate to terephthalate ratio of 1:3 to 3:1. This ITR-PC copolymer has less than 100 ppm of phenolic end groups.

A specific example of a poly(carbonate)-co-(monoaryl arylate ester) is a poly(bisphenol A carbonate)-co-(isophthalate-terephthalate-resorcinol ester) of formula (11c)

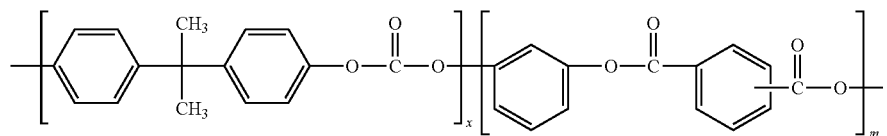

(11c)

wherein m is 4 to 100, 4 to 90, 5 to 70, more specifically 5 to 50, or still more specifically 10 to 30, and the mole ratio of x:n is 99:1 to 1:99, specifically 90:10 to 10:90. The ITR ester units are present in the poly(carbonate-arylate ester) copolymer in an amount greater than or equal to 95 mol %, specifically greater than or equal to 99 mol %, and still more specifically greater than or equal to 99.5 mol % based on the total moles of ester units. Other carbonate units, other ester units, or a combination comprising at least one of the foregoing can be present, in a total amount of 1 to 20 mole % based on the total moles of units in the copolymers, for example resorcinol carbonate units of formula (12) and bisphenol ester units of formula (10a).

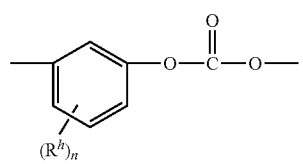

(12)

The bisphenol ester units can be bisphenol A phthalate ester units of the formula

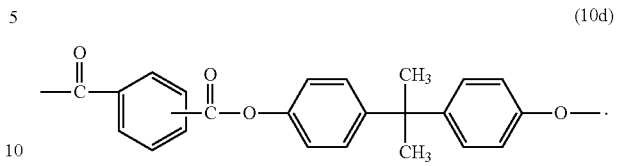

(10d)

In an embodiment, poly(bisphenol A carbonate)-co-(isophthalate-terephthalate-resorcinol ester) (11c) comprises 1 to 20 mol % of bisphenol A carbonate units, 60 to 99 mol % of isophthalic acid-terephthalic acid-resorcinol ester units, and optionally 1 to 20 mol % of resorcinol carbonate units, isophthalic acid-terephthalic acid-bisphenol A phthalate ester units, or a combination comprising at least one of the foregoing. In another embodiment, poly(bisphenol A carbonate)-co-(isophthalate-terephthalate-resorcinol ester) (11c) 70 to 90 mol % of bisphenol A carbonate units, 10 to 30 mol % of isophthalic acid-terephthalic acid-resorcinol ester units, and optionally, 1 to 60 mol % resorcinol carbonate units, isophthalic acid-terephthalic acid-bisphenol A ester units, or a combination thereof.

In another embodiment, the poly(carbonate-arylate ester) copolymers further comprise siloxane units (also known as "diorganosiloxane units"). In a specific embodiment these copolymers comprises carbonate units (6) derived from a bisphenol (8), specifically bisphenol-A; monoaryl arylate ester units (10b), and siloxane units. Still more specifically, the poly(carbonate-arylate ester) copolymers comprise bisphenol-A carbonate units, ITR ester units (10c), and siloxane units (9). For convenience, these polymers, poly(bisphenol-A carbonate)-co-poly(isophthalate-terephthalate-resorcinol ester)-co-poly(siloxane), are referred to herein as "ITR-PC-siloxane" copolymers.

The relative amount of polysiloxane units (9) in the ITR-PC-siloxane copolymers depends on the desired properties of the thermoplastic composition, such as impact, chemical resistance, and melt viscosity. In particular the poly(carbonate-arylate ester) is selected to have an average value of E that provides good impact and/or transparency properties, as well as to provide the desired weight percent of siloxane units in the thermoplastic composition. For example, the poly(carbonate-arylate ester)s can comprise siloxane units in an amount of 0.3 to 30 weight percent (wt. %), specifically 0.5 to 25 wt. %, or 0.5 to 15 wt. %, based on the total weight of the polymers in the thermoplastic composition, with the proviso that the siloxane units are provided by polysiloxane units covalently bonded in the polymer backbone of the poly(carbonate-arylate ester).

In an embodiment, the PC-ITR-siloxane copolymers comprise 1 to 40 mol %, or 1 to 20 mol % of bisphenol-A carbonate units, 50 to 95 mol % of ITR ester units (10c), and an amount of polysiloxane units (9b), specifically (9b-1), even more specifically (9b-2), (9b-3), (9b-4) or a combination comprising at least one of the foregoing (specifically of formula 9b-2) in an amount effective to provide 0.1 to 10 wt. % of siloxane units, each based on the total copolymer. For example, the PC-ITR-siloxane copolymers can comprise 1 to 20 mol % of bisphenol-A carbonate units, 60 to 90 mole % of ITR ester units, and an amount of polysiloxane units (9b), (9c), (9d), or a combination comprising at least one of the foregoing (specifically of formula 9b) effective to provide 0.1 to 10 wt. % of siloxane units, each based on the total copolymer.

Other carbonate units, other ester units, or a combination thereof can be present in the PC-ITR-siloxane copolymers, in a total amount of 1 to 20 mole % based on the total moles of units in the copolymers, for example resorcinol carbonate units, and bisphenol-A phthalate ester units of the formula. In an embodiment, the ITR-PC-siloxane comprises 1 to 20 mol % of bisphenol-A carbonate units, 60-98 mol % of isophthalic acid-terephthalic acid-resorcinol ester units, and optionally 1 to 20 mol % of resorcinol carbonate units (12), isophthalic acid-terephthalic acid-bisphenol-A ester units (10d), or a combination thereof, together with the siloxane units.

The polycarbonate copolymers comprising arylate ester units can have an $M_w$ of 2,000 to 100,000 g/mol, specifically 3,000 to 75,000 g/mol, more specifically 4,000 to 50,000 g/mol, more specifically 5,000 to 35,000 g/mol, and still more specifically 17,000 to 30,000 g/mol. Molecular weight determinations are performed using GPC using a cross linked styrene-divinyl benzene column, at a sample concentration of 1 milligram per milliliter, and as calibrated with polycarbonate standards. Samples are eluted at a flow rate of about 1.0 ml/min with methylene chloride as the eluent.

The thermoplastic composition can also comprise a poly (siloxane-etherimide) copolymer comprising siloxane blocks (9) and polyetherimide units of formula (1). In this embodiment, the poly(siloxane-etherimide) polymer is a block or graft copolymer comprising etherimide units of formula (1) and blocks of polysiloxane units, i.e., a poly (siloxane-co-etherimide), referred to herein as a "(polyetherimide-siloxane)." Block poly(siloxane-etherimide) copolymers comprise siloxane blocks and etherimide blocks in the polymer backbone.

The poly (siloxane-etherimide)s can be formed by polymerization of an aromatic bisanhydride (5) and a diamine component comprising an organic diamine of the formula $H_2N$—R—$NH_2$ (13a) wherein R is the same as R in formula (1) or mixture of diamines, and a polysiloxane diamine of the formula (13b):

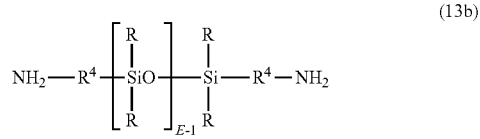

(13b)

wherein R and E are as described in formula (9), and $R^4$ is each independently a $C_2$-$C_{20}$ hydrocarbon, in particular a $C_2$-$C_{20}$ arylene, alkylene, or arylenealkylene group. In an embodiment $R^4$ is a $C_2$-$C_{20}$ alkyl group, specifically a $C_2$-$C_{20}$ alkyl group such as propylene, and E has an average value of 5 to 100, 5 to 75, 5 to 60, 5 to 15, or 15 to 40.

In some poly(siloxane-etherimide)s the diamine component can contain 10 to 90 mole percent (mol %), or 20 to 50 mol %, or 25 to 40 mol % of polysiloxane diamine (13b) and 10 to 90 mol %, or 50 to 80 mol %, or 60 to 75 mol % of diamine (13a), for example as described in U.S. Pat. No. 4,404,350. Examples of specific poly(siloxane-etherimide) are described in U.S. Pat. Nos. 4,404,350, 4,808,686, and 4,690,997. In an embodiment, the poly(siloxane-etherimide) has units of formula (14)

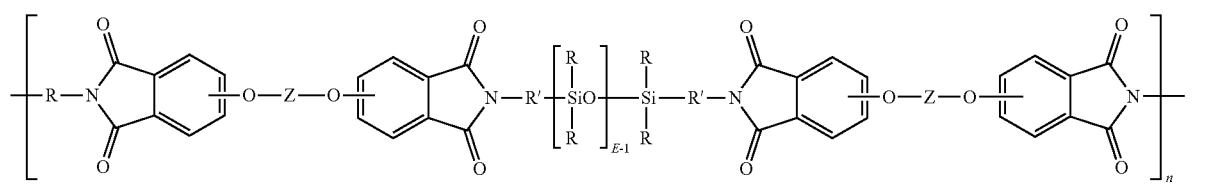

(14)

wherein R and E of the siloxane are as in formula (9), the R and Z of the imide are as in formula (1), R' is the same as $R^4$ as in formula (13b), and n is an integer from 5 to 100. In a specific embodiment, the R of the etherimide is a phenylene, Z is a residue of bisphenol A, R' is n-propylene, and each R of the siloxane is methyl. In an embodiment the poly(siloxane-etherimide) comprises 10 to 50 wt %, 10 to 40 wt %, or 20 to 35 wt % polysiloxane units, based on the total weight of the poly(siloxane-etherimide).

The impact modifiers in the impact modifier composition include elastomer-modified graft copolymers comprising (i) an elastomeric (i.e., rubbery) polymer substrate having a Tg less than or equal to 10° C., more specifically less than or equal to −10° C., or more specifically −40° to −80° C., and (ii) a rigid polymeric superstrate grafted to the elastomeric polymer substrate. As is known, elastomer-modified graft copolymers can be prepared by first providing the elastomeric polymer, then polymerizing the constituent monomer(s) of the rigid phase in the presence of the elastomer to obtain the graft copolymer. The grafts can be attached as graft branches or as shells to an elastomer core. The shell can merely physically encapsulate the core, or the shell can be partially or essentially completely grafted to the core.

Materials for use as the elastomer phase include, for example, conjugated diene rubbers; copolymers of a conjugated diene with less than or equal to 50 wt % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers.

Conjugated diene monomers for preparing the elastomer phase include those of formula (17)

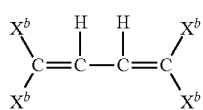

(17)

wherein each $X^b$ is independently hydrogen, $C_1$-$C_5$ alkyl, or the like. Examples of conjugated diene monomers that can be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as combinations comprising at least one of the foregoing conjugated diene monomers. Specific conjugated diene homopolymers include polybutadiene and polyisoprene. Hydrogenation of the butadiene rubbers can lead to ethylene-butylene rubbers. Often such hydrogenation is accomplished leaving low levels, less than 5 mol %, of residual olefinic unsaturation.

Copolymers of a conjugated diene rubber can also be used. Monomers that are useful for copolymerization with the conjugated diene include monovinylaromatic monomers containing condensed aromatic ring structures, such as vinyl naphthalene, vinyl anthracene, and the like, or monomers of formula (18)

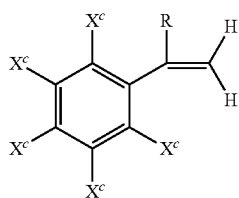

(18)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkylaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. monovinylaromatic monomers that can be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like, and combinations comprising at least one of the foregoing compounds. Styrene and/or alpha-methylstyrene can be used as monomers copolymerizable with the conjugated diene monomer.

Other monomers that can be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (19)

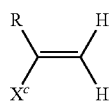

(19)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, or the like. Examples of monomers of formula (19) include acrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth) acrylate, n-propyl (meth)acrylate, isopropyl (meth)acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Combinations of the foregoing monovinyl monomers and monovinylaromatic monomers can also be used.

(Meth)acrylate monomers for use in the elastomeric phase can be cross-linked, particulate emulsion homopolymers or copolymers of $C_{1-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth) acrylate monomers can optionally be polymerized in admixture with less than or equal to 15 wt % of comonomers of formulas (17), (18), or (19), based on the total monomer weight. comonomers include but are not limited to butadiene, isoprene, styrene, methyl methacrylate, phenyl methacrylate, phenethylmethacrylate, N-cyclohexylacrylamide, vinyl methyl ether or acrylonitrile, and combinations comprising at least one of the foregoing comonomers. Optionally, 5 wt. % or less of a polyfunctional crosslinking comonomer can be present, based on the total monomer weight, for example, divinylbenzene, alkylenediol di(meth)acrylates such as glycol bisacrylate, alkylenetriol tri(meth) acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase can be polymerized by mass, emulsion, suspension, solution or combined processes such as bulk-suspension, emulsion-bulk, bulk-solution or other techniques, using continuous, semi-batch, or batch processes. The particle size of the elastomer substrate is not critical. For example, an average particle size of 0.001 to 25 micrometers, specifically 0.01 to 15 micrometers, or even more specifically 0.1 to 8 micrometers can be used for emulsion based polymerized rubber lattices. A particle size of 0.5 to 10 micrometers, specifically 0.6 to 1.5 micrometers can be used for bulk polymerized rubber substrates. Particle size can be measured by simple light transmission methods or capillary hydrodynamic chromatography (CHDF). The elastomer phase can be a particulate, moderately cross-linked conjugated butadiene or $C_{4-6}$ alkyl acrylate rubber, and specifically has a gel content greater than 70%. Also useful are combinations of butadiene with styrene and/or $C_{4-6}$ alkyl acrylate rubbers.

The elastomeric phase comprises 5 to 95 wt % of the total graft copolymer, more specifically 20 to 90 wt %, and even more specifically 40 to 85 wt % of the elastomer-modified graft copolymer, the remainder being the rigid graft phase.

The rigid phase of the elastomer-modified graft copolymer can be formed by graft polymerization of a combination comprising a monovinylaromatic monomer and optionally at least one comonomer in the presence of at least one elastomeric polymer substrates. The above-described monovinylaromatic monomers of formula (18) can be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Useful comonomers include, for example, the above-described monovinylic monomers and/or monomers of the general formula (17). In an embodiment, R is hydrogen or $C_1$-$C_2$ alkyl, and $X^c$ is cyano or $C_1$-$C_{12}$ alkoxycarbonyl. comonomers for use in the rigid phase include acrylonitrile, methacrylonitrile, methyl (meth)acrylate, ethyl (meth)acrylate, n-propyl (meth)acrylate, isopropyl (meth)acrylate, and the like, and combinations comprising at least one of the foregoing comonomers.

The relative ratio of monovinylaromatic monomer and comonomer in the rigid graft phase can vary widely depending on the type of elastomer substrate, type of monovinylaromatic monomer(s), type of comonomer(s), and the desired properties of the impact modifier. The rigid phase can generally comprise less than or equal to 100 wt % of monovinyl aromatic monomer, specifically 30 to 100 wt %, more specifically 50 to 90 wt % monovinylaromatic monomer, with the balance of the rigid phase being comonomer(s).

Depending on the amount of elastomer-modified polymer present, a separate matrix or continuous phase of ungrafted rigid polymer or copolymer can be simultaneously obtained along with the elastomer-modified graft copolymer. Typically, such impact modifiers comprise 40 to 95 wt. % elastomer-modified graft copolymer and 5 to 65 wt. % graft copolymer, based on the total weight of the impact modifier. In another embodiment, such impact modifiers comprise 50 to 85 wt. %, more specifically 75 to 85 wt % rubber-modified graft copolymer, together with 15 to 50 wt. %, more specifically 15 to 25 wt. % graft copolymer, based on the total weight of the impact modifier.

Processes known for the formation of the foregoing elastomer-modified graft copolymers include mass, emulsion, suspension, and solution processes, or combined processes such as bulk-suspension, emulsion-bulk, bulk-solution, or other techniques, using continuous, semi-batch, or batch processes.

The impact modifier composition includes at least a first and a second impact modifier, preferably a core-shell acrylic rubber and the SEBS rubber. The impact modifier composition can be present in the thermoplastic composition in amounts of 5 to 20 wt. %, based on the total weight of the thermoplastic composition, preferably 5 to 15 wt. %, more preferably 5 to 12 wt. %, each based on the total weight of the thermoplastic composition.

The impact modifier can include 3 to 17 wt. %, preferably 3 to 10 wt. %, more preferably 2 to 7 wt. % of each of the first and second impact modifier, preferably a core-shell acrylic rubber and the SEBS rubber, based on total impact modifier weight. A specific impact modifier composition includes 4 to 10 wt. % of the core-shell acrylic rubber and 2 to 6 wt. % of the styrene-ethylene-butylene-styrene rubber. The weight ratio of the first impact modifier to the second impact modifier can be 1:5 to 5:1, preferably 1:3 to 3:1.

A specific core-shell acrylic rubber includes 3 to 30 wt. %, preferably 3 to 20 wt. % poly(methyl methacrylate ("PMMA") shell and 50 to 97 wt. %, preferably 80 to 97 wt. % poly(butyl acrylate) core, based on total component weight. This core-shell acrylic rubber can have a particle size of 100 to 500 micron diameter, preferably 100 to 300, more preferably 200 to 300.

Hydrogenated butadiene styrene block copolymers, i.e. SEBS rubbers, are of special note as they not only have good thermal stability when exposed to high temperature in the melt but also during the fabrication and end use of an article made therefrom. While not being constrained by any mechanism or mode of action it is thought that the SEBS rubber, in combination with core-shell rubbery modifiers, is important in developing the contiguous morphology leading to improved impact and better chemical resistance. A specific styrene-ethylene-butylene-styrene ("SEBS") rubber includes olefinic unsaturation, wherein the level of unsaturation can be less than 10%, less than 8% or less than 5%, for example 0.1 to 10%, 0.1 to 8%, or 0.1 to 5%. The GPC average molecular weight is 10,000 to 100,000, preferably 20,000 to 80,000, a styrene content 15 to 70 wt. %, preferably less than 50 wt. %, or 20 to 40 wt. %, and a specific gravity of 0.94 to 0.98 g/cm$^3$.

The thermoplastic compositions can include various other polymers to adjust the properties of the thermoplastic compositions, with the proviso that the other polymers are selected so as to not adversely affect the desired properties of the thermoplastic composition significantly. For example, combination of a polycarbonate copolymer as described above and a homopolycarbonate having repeating units (1) such as a bisphenol A homopolycarbonate can still provide thermoplastic compositions having the desirable impact, colorability, and chemical resistance. In general such other polymers provide less than 20 wt. %, less than 15 wt. %, less than 10 wt. %, less than 5 wt. %, or less than 1 wt. % of the total composition. In an embodiment, no other polymers are present. In a specific embodiment, no polymers containing halogen are present in the thermoplastic compositions.

The thermoplastic compositions can include various additives, with the proviso that the additive(s) are selected so as to not adversely affect the desired properties of the thermoplastic composition significantly, in particular high impact, stable colorability, and chemical resistance. Such additives can be mixed at a suitable time during the mixing of the components for forming the composition. Exemplary additives include fillers, reinforcing agents, antioxidants, heat stabilizers, light stabilizers, ultraviolet (UV) light stabilizers, plasticizers, processing aids, lubricants, mold release agents, antistatic agents, colorants such as such as titanium dioxide, carbon black, and organic dyes, surface effect additives, radiation stabilizers, additional flame retardants, and anti-drip agents. A combination of additives can be used. In general, the additives are used in the amounts generally known to be effective. The total amount of additives (other than any filler or reinforcing agents) is generally 0.01 to 25 parts per hundred parts by the total weight of the polymers in the composition (PHR). In some instances the additive has a molecular weight of at least 500 Dalton to reduce migration from the molten polymer during compounding and molding.

In an exemplary embodiment, glass fibers are used as the reinforcing fillers. Any known glass fibers can be used. The reinforcing agents, specifically the glass fibers, are used in effective amounts, for example 1 to 200 parts by weight, based on 100 parts by weight of the polymer composition, more specifically 30 to 150 parts by weight, based on 100 parts by weight of the polymer composition.

Colorants such as pigment and/or dye additives can also be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.01 to 25 parts by weigh PHR.

Dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.01 to 20 parts by weight PHR.

The use of pigments such as titanium dioxide produces white compositions, which are commercially desirable. Pigments such as titanium dioxide (or other mineral fillers) can be present in the thermoplastic compositions in amounts of 0.1 to 30 wt. %, 0.5 to 25 wt. %, 1 to 20 wt. %, or 5 to 15 wt. %, each based on the total weight of the composition.

Titanium dioxide ($TiO_2$) can be coated or uncoated. In an embodiment, the titanium dioxide is an inorganic coated titanium dioxide without an organic coating. In another embodiment, the titanium dioxide is an organic coated titanium dioxide with an organic coating. The organic coating comprises polysiloxane. Coated titanium dioxide can provide improved colorability to the thermoplastic composition. $TiO_2$ can be present in amounts of 0 to 15 wt. %, preferably 5 to 10 wt. %, based on total composition weight.

A specific $TiO_2$ is silica/alumina encapsulated, passivated with siloxane comprising silane functionality. This $TiO_2$ has a particle diameter 1 to 8 microns and a sodium metal content less than 5000 ppm.

The composition can have any suitable color including white, light gray, and/or combinations thereof. The white or light gray color can exhibit an L* value greater than or equal to 80. A composition having a white or light gray color can comprise an amount of titanium dioxide in amounts of 0.1 to 30 wt. %, 0.1 to 25 wt. %, 0.1 to 20 wt. %, or 0.1 to 15 wt. %, each based on the total weight of the composition.

The composition can have any suitable color including gray, black, and/or combinations thereof. The gray or black color can exhibit an L* value of below 80. A composition having a gray or black color can comprise an amount of carbon black within 0.001 to 25 parts per hundred by weight (pph), or 0.001 to 15 pph, or 0.001 to 5 pph, or 0.01 to 10 pph, or 0.1 to 15 pph.

Light stabilizers and/or ultraviolet light (UV) absorbing additives, also referred to as UV stabilizers, can also be used. Examples of suitable UV stabilizers can include benzophenones, triazines, benzoxazinones, benzotriazoles, benzoates, formamidines, cinnamates/propenoates, aromatic propanediones, benzimidazoles, cycloaliphatic ketones, formanilides, cyanoacrylates, benzopyranones, salicylates, and combinations comprising at least one of the foregoing.

Light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers.

UV absorbing additives include hydroxybenzophenones; hydroxybenzotriazoles; hydroxybenzotriazines; cyanoacrylates; oxanilides; benzoxazinones; aryl salicylates; monoesters of diphenols such as resorcinol monobenzoate; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); poly[(6-morphilino-s-triazine-2, 4-diyl)[2,2,6,6-tetramethyl-4-piperidyl) imino]-hexamethylene[(2,2,6,6-tetramethyl-4-piperidyl)imino], 2-hydroxy-4-octyloxybenzophenone (UVINUL™ 3008), 6-tert-butyl-2-(5-chloro-2H-benzotriazole-2-yl)-4-methylphenyl (UVINUL™ 3026), 2,4-di-tert-butyl-6-(5-chloro-2H-benzotriazole-2-yl)-phenol (UVINUL™ 3027), 2-(2H-benzotriazole-2-yl)-4,6-di-tert-pentylphenol (UVINUL™ 3028), 2-(2H-benzotriazole-2-yl)-4-(1,1,3,3-tetramethylbutyl)-phenol (UVINUL™ 3029), 1,3-bis[(2' cyano-3',3'-diphenylacryloyl)oxy]-2,2-bis-{[(2'-cyano-3', 3'-diphenylacryloyl) oxy]methyl}-propane (UVINUL™ 3030), 2-(2H-benzotriazole-2-yl)-4-methylphenol (UVINUL™ 3033), 2-(2H-benzotriazole-2-yl)-4,6-bis(1-methyl-1-phenyethyl) phenol (UVINUL™ 3034), ethyl-2-cyano-3,3-diphenylacrylate (UVINUL™ 3035), (2-ethylhexyl)-2-cyano-3,3-diphenylacrylate (UVINUL™ 3039), N,N'-bisformyl-N,N'-bis(2,2,6,6-tetramethyl-4-piperidinyl)hexamethylendiamine (UVINUL™ 4050H), bis-(2,2,6,6-tetramethyl-4-piperidyl)-sebacate (UVINUL™ 4077H), bis-(1,2,2,6,6-pentamethyl-4-piperdiyl)-sebacate+methyl-(1,2,2,6,6-pentamethyl-4-piperidyl)-sebacate (UVINUL™ 4092H) 1,3-bis[(2-cyano-3, 3-diphenylacryloyl)oxy]-2,2-bis[[(2-cyano-3, 3-diphenylacryloyl)oxy]methyl]propane (UVINUL™ 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; TINUVIN™ 234; TINUVIN™ 360, nano-size inorganic materials such as titanium oxide, cerium oxide, and zinc oxide, all with particle size less than or equal to 100 nanometers; or the like, or combinations comprising at least one of the foregoing UV absorbers. UV absorbers can be used in amounts of 0.01 to 1 part by weight, based on 100 parts by weight of thermoplastic and impact modifier. UV absorbers that can be particularly useful with the thermoplastic compositions disclosed herein include 2-(2H-benzotriazol-2-yl)-4-(1,1,3,3-tetramethylbutyl)-phenol (e.g., CYASORB™ 5411 commercially available from Cytec Industries, Inc., Woodland Park, N.J.) and 2,2'-(1,4-phenylene)bis(4H-3,1-benzoxazin-4-one) (e.g., CYASORB™ UV-3638, commercially available from Cytec Industries, Inc., Woodland Park, N.J.), and combinations comprising at least one of the foregoing. In another embodiment, the UV stabilizer comprises 2,2"-Methylenebis(6-(2H-benzotriazol-2-yl)-4-4(1,1,3,3,-tetramethylbutyl)phenol, available as LA-31RG having a CAS 103597-45-1; 2,2'-(p-phenylene) bis-4H-3,1-Benzoxazin-4-one", available as Cyasorb UV-3638, and having CAS: 18600-59-4.

The UV stabilizers and UV absorbing additives can be present in an amount of up to 15 wt. %, for example, 0.01 to 6 wt %, or 0.01 to 1 wt %, specifically 0.1 to 2 wt %, and more specifically, 0.15 to 4 wt %, or 0.15 to 6 wt %, each based upon the total weight of the thermoplastic composition.

Organophosphites include triaryl and trialkyl esters of phosphorous acid. Examples of such phosphites are disclosed in H. Zweifel (Ed) *Plastics Additives Handbook,* 5th edition, Hanser Publishers, Munich 2000. Organophosphites can be in liquid and solid form, preferably in solid form. Suitable organophosphites include triaryl esters of phosphorous acid, preferably $C_{1-12}$ alkyl mono-, di- and tri-substituted triaryl esters of phosphorous acid, more preferably trisnonylphenyl phosphite ("TNPP"), tris (2,4-di-tert-butyl) phenyl phosphite ("2,4-DTBP"), or a combination comprising at least one of the foregoing. Also included as solid phosphites are bis(2,4-dicumylphenyl) pentaerythritol diphosphite, bis(2,4-di-tert-butylphenyl) pentaerythritol diphosphite, or a combination comprising at least one of the foregoing. In general, the phosphorus content of the organophosphites is 4 to 15 wt. % preferably 4 to 10 wt. %, based on total organophosphite weight. The organophosphites can be present in amounts of 0.01 to 0.5 wt. %, preferably 0.1 to 0.5 wt. %, based on weight of the composition.

Useful flame retardants include organic compounds that include phosphorus, bromine, and/or chlorine. In an embodiment, the flame retardant is an organic compound containing at least 30 carbon atoms and having a molecular weight of greater than or equal to 400 Daltons.

Flame retardant aromatic phosphates include triphenyl phosphate, tricresyl phosphate, isopropylated triphenyl phosphate, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, and 2-ethylhexyl diphenyl phosphate. Di- or polyfunctional aromatic phosphorus-containing compounds are also useful, for example resorcinol tetraphenyl diphosphate (RDP), the bis(diphenyl) phosphate of hydroquinone and the bis(diphenyl) phosphate of bisphenol A, respectively, and their oligomeric and polymeric counterparts. Flame retardant compounds containing phosphorus-nitrogen bonds include phosphonitrilic chloride, phosphorus ester amides, phosphoric acid amides, phosphonic acid amides, phosphinic acid amides, and tris(aziridinyl) phosphine oxide. When used, phosphorus-containing flame retardants are present in amounts of 0.1 to 30 parts by weight, more specifically 1 to 20 parts by weight, based on 100 parts by weight of the total composition, excluding any filler. In another embodiment, depending on the particular organophosphorus compound used, the thermoplastic compositions can comprise from 0.3 to 20 wt. %, or 0.5 to 15 wt. %, or 3.5 to 12 wt. % of the organophosphorus flame retardant, each based on the total weight of the composition. Specifically, the organophosphorus compounds can be bisphenol A bis(diphenyl phosphate), triphenyl phosphate, resorcinol bis(diphenyl phosphate), tricresyl phosphate, or a combination comprising at least one of the foregoing.

Halogenated materials can also be used as flame retardants, for example bisphenols of which the following are representative: 2,2-bis-(3,5-dichlorophenyl)-propane; bis-(2-chlorophenyl)-methane; bis(2,6-dibromophenyl)-methane; 1,2-bis-(2,6-dichlorophenyl)-ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; and 2,2-bis-(3,5-dichloro-4-hydroxyphenyl)-propane 2,2 bis-(3-bromo-4-hydroxyphenyl)-propane. Other halogenated materials include 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, as well as oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. When present, halogen containing flame retardants are present in amounts of 1 to 25 parts by weight, more specifically 2 to 20 parts by weight, based on 100 parts by weight of the total composition, excluding any filler.

Alternatively, the thermoplastic composition can be essentially free of chlorine and bromine. "Essentially free of chlorine and bromine" is defined as having a bromine and/or chlorine content of less than or equal to 100 parts per million by weight (ppm), less than or equal to 75 ppm, or less than or equal to 50 ppm, based on the total parts by weight of the composition, excluding any filler.

Inorganic flame retardants known in the art can also be used. When present, inorganic flame retardant salts are present in amounts of 0.01 to 10 parts by weight, more specifically 0.02 to 1 parts by weight, based on 100 parts by weight of the total composition, excluding any filler.

Methods for forming the thermoplastic compositions can vary. In an embodiment, the polymers are combined (e.g., blended) with any additives (e.g., a mold release agent) such as in a screw-type extruder. The polymers any additives can be combined in any order, and in form, for example, powder, granular, filamentous, as a masterbatch, and the like. The thermoplastic compositions can be foamed, extruded into a sheet, or optionally pelletized. Methods of foaming a thermoplastic composition using frothing or physical or chemical blowing agents are known and can be used. The pellets can be used for molding into articles, foaming, or they can be used in forming a sheet of the flame retardant thermoplastic composition. In some embodiments, the composition can be extruded (or co-extruded with a coating or other layer) in the form of a sheet and/or can be processed through calendaring rolls to form the desired sheet.

The thermoplastic compositions can be formulated to have lower densities, in particular a density of 1.35 g/cc or less, 1.32 g/cc or less, or 1.29 g/cc or less. The same or similar values can be obtained in components having a wide range of thicknesses, for example from 0.1 to 10 mm, or 0.5 to 5 mm.

The thermoplastic compositions can further have good melt viscosities, which aids processing. The thermoplastic compositions can have a melt volume flow rate (MVR, cubic centimeter per 10 minutes (cc/10 min) of 4 to about 30, greater than or equal to 6, greater than or equal to 8, greater than or equal to 10, greater than or equal to 12, greater than or equal to 14, greater than or equal to 16, greater than or equal to 18, or greater than or equal to 20 cc/min, measured at 300° C./1.2 Kg at 360 second dwell according to ISO 1133. The same or similar values can be obtained in articles having a wide range of thicknesses, for example from 0.1 to 10 mm, or 0.5 to 5 mm.

The thermoplastic compositions can further have excellent impact properties, in particular multiaxial impact (MAI), and ductility. The compositions can have an MAI equal to or higher than 100 J, determined at 23° C. at an impact speed of 4.4 m/second in accordance with ISO 6603 on discs with a thickness of 3.2 mm. The compositions can have a ductility in multiaxial impact of 80% and higher, specifically 100%, determined at 23° C. at an impact speed of 4.4 m/second in accordance with ISO 6603 on discs with a thickness of 3.2 mm. These values can be obtained in articles having a wide range of thicknesses, for example from 0.1 to 10 mm, or 0.5 to 5 mm. In some embodiments, the composition can have an MAI equal to or higher than 100 J and a high ductility (80% or greater, for example 100%) at lower temperatures such as 10° C., 0° C., −10° C., −20° C. and −30° C. In some embodiments, the compositions can have an Izod notched impact energy of at least 10 kJ/m$^2$, at least 20 kJ/m$^2$, or at least 30 kJ/m$^2$ measured at 23° C. according to ISO 180/1A using a multipurpose test specimen in accordance with ISO 3167 TYPE A. In an embodiment, the thermoplastic compositions have a notched Izod impact energy of at least 500 J/m at 23° C. measured in accordance to ASTM D256, a tensile strength (yield) of at least 50 MPa, and an elongation at break of at least 50% at 5 mm/min.

The thermoplastic composition is able to be metallized with a metal such as, but not limited to aluminum, preferably wherein the aluminum is deposited and anodized to provide desirable characteristics such as corrosion resistance and wear resistance, better adhesion to paints and dyes vs. bare metal.

Most polymeric materials may not survive the various mechanical/chemical treatments (such as pre-treatment, etching, milling, desmutting, anodizing, coloring, sealing) on the plastic material typically involved during the anodization process.

Advantageously, the thermoplastic composition is able to endure the anodization process by maintaining its properties and structural integrity.

The anodization processes are not particularly limited. In an embodiment, preceding the anodization process, wrought alloys are cleaned in either a hot soak cleaner or in a solvent bath and can be etched in sodium hydroxide (normally with added sodium gluconate), ammonium bifluoride or brightened in a mix of acids. Cast alloys are normally best just cleaned due to the presence of intermetallic substances unless they are a high purity alloy such as LMO.

The anodized aluminium layer is grown by passing a direct current through an electrolytic solution, with the aluminium object serving as the anode (the positive electrode). The current releases hydrogen at the cathode (the negative electrode) and oxygen at the surface of the aluminium anode, creating a build-up of aluminium oxide. Alternating current and pulsed current is also possible but rarely used. The voltage required by various solutions can range from 1 to 300 V DC, although most fall in the range of 15 to 21 V. Higher voltages are typically required for thicker coatings formed in sulfuric and organic acid. The anodizing current varies with the area of aluminium being anodized, and typically ranges from 30 to 300 amperes/meter$^2$ (2.8 to 28 ampere/ft$^2$). The metal forming the antenna can comprise aluminum, silver, copper, tin, nickel, gold, zinc, cobalt, iron, or a combination comprising at least one of the foregoing.

Aluminum anodizing is usually performed in an acid solution which slowly dissolves the aluminium oxide. The acid action is balanced with the oxidation rate to form a coating with nanopores, 10-150 nm in diameter. These pores are what allow the electrolyte solution and current to reach the aluminium substrate and continue growing the coating to greater thickness beyond what is produced by autopassivation. However, these same pores will later permit air or water to reach the substrate and initiate corrosion if not sealed. They are often filled with colored dyes and/or corrosion inhibitors before sealing. Because the dye is only superficial, the underlying oxide can continue to provide corrosion protection even if minor wear and scratches can break through the dyed layer.

Conditions such as electrolyte concentration, acidity, solution temperature, and current must be controlled to allow the formation of a consistent oxide layer. Harder, thicker films tend to be produced by more dilute solutions at lower temperatures with higher voltages and currents. The film thickness can range from under 0.5 micrometers for bright decorative work up to 150 micrometers for architectural applications.

The thermoplastic composition can further have excellent electrical tracking properties. Electrical tracking is defined as the formation of conductive pathways on the surface of a polymer under certain conditions and at a certain voltage. Electrical tracking in a thermoplastic material can be a source of fire in thermoplastic parts that are used in electrical applications and so resistance to electrical tracking is often an important safety requirement for a thermoplastic composition, which is used in certain electrical applications.

Electrical tracking resistance is the ability of a thermoplastic formulation to resist electrical tracking under certain conditions and certain voltages. Electrical tracking resistance on a sample of a thermoplastic composition can be measured using a test procedure identified as ASTM D-2303. A common method of reporting the electrical tracking resistance of a thermoplastic is by its comparative tracking index rating (CTI). The CTI rating of a thermoplastic composition indicates how resistant a thermoplastic material is to electrical tracking at certain voltages. CTI ratings range from CTI-0 to CTI-5 with a CTI-1 rating indicating that a thermoplastic is more resistant to electrical tracking than a plastic with a lower CTI rating (for example CTI-3).

Shaped or molded articles comprising the thermoplastic compositions are also provided. The thermoplastic compositions can be formed into useful articles by a variety of techniques, such as injection molding, extrusion (including multilayer extrusion), rotational molding, blow molding, foaming and casting or molding, 3-dimensional printing, and thermoforming. Thus the thermoplastic compositions can be used to form a foamed article, a molded article, a thermoformed article, a printed article, an extruded sheet (which includes films), a multilayer extruded sheet, a cast or an extruded fiber or filament (for 3-dimensional printing, for example), one or more layers of a multi-layer article (e.g. a cap layer), a substrate for a coated article, or a substrate for a metallized article.

In an embodiment, the thermoplastic compositions are useful for the manufacture of multilayered sheets, wherein any one or more layers can comprise a composition of any one or more of the embodiments of this disclosure. For example, the multilayer sheets can comprise a first layer (e.g., a base layer) comprising a composition of any embodiments of this disclosure and a second layer (e.g., a cap layer) disposed on a side of the first layer. The second layer is selected based on the desired function and properties (e.g., transparency, weatherability, ultraviolet light resistance, scratch resistance, and the like). Exemplary materials for the cap layer include polyacetals, polyacrylonitriles, polyamides, polydienes (e.g., polybutadiene), polyethers, polyetherether ketones, polyetherimides, polyethersulfones, polyimides, polyketones, polyolefins, polysiloxanes, polystyrenes, polysulfones, polyvinyl acetates, polyvinyl chlorides, polyvinylidene chlorides, polyvinyl esters, polyvinyl ethers, polyvinyl ketones, polyvinyl pyridines, polyvinyl pyrrolidones, and the like, or a combination comprising at least one of the foregoing. Specific materials for the second layer include polyesters such as poly(ethylene terephthalate), cycloaliphatic polyester copolymers, poly(($C_{1-4}$alkylene) naphthalate), and poly(butylene terephthalate), polyfluorocarbons (e.g, poly(vinyl fluoride), poly(tetrafluoroethylene), and poly(vinylidene fluoride)) polyfluorochlorocarbons, ($C_{1-6}$alkyl) (meth)acrylates (e.g., poly(methyl methacrylate ("PMMA"), polyurethanes, acrylonitrile-butadiene-styrene (ABS), other polycarbonates, or a combination comprising at least one of the foregoing. In an embodiment, the cap layer is selected so as to not significantly adversely affect the desired properties of the compositions described herein, in particular the low smoke and flame retardant properties. In an embodiment one or more of the layers is thermoformable.

Still other layers can be present in the multilayer article as known in the art, for example various adhesive layers, primer layers, substrate layer, decorative or visual effect layer, and additional other layers. The various layers can be coextruded, laminated, or adhered to form the multilayer sheet. Generally, the overall thickness of the sheet can be, for example 1 micrometer to 1 centimeter, or 5 micrometers to 5 millimeters. More particularly, the sheet can have a thickness of 1 mil (25.4 micrometers (μm)) to 500 mils (12,700 μm), or 5 mils (127 μm) to 40 mils (1016 μm), or 5 mils (127 μm) to 30 mils (762 μm). The multilayer articles can be used for many applications, such as for skylights, signs, glazing, laminates, packaging food, clothing, pharmaceutical products, multi-wall sheets, and the like.

The above-described compositions, in particular compositions comprising an impact modifier, a polyetherimide, poly(carbonate-siloxane) and compatibilizer are useful for the manufacture of components for consumer electronics. One key formulation challenge is retention of color during UV-aging while maintaining a range of other properties such as one or more of heat aging, tensile strength, elongation at break, flame retardance and flexibility. Compositions having improved color retention are of continuing interest for use in the consumer electronics area. In an embodiment, the compositions are color stable, i.e., the color of the compositions of experience a Delta E after aging of less than 20, less than 10, more preferably less than 5, after 300 hours of exposure to UV radiation, for example according to ASTM D4459.

The compositions can also be high gloss, where gloss can be measured at 60° according to ASTM D523.

Thus, the compositions containing an impact modifier, polyetherimide, poly(carbonate-siloxane) and compatibilizer, and up to 25 wt. % of titania can be used in the manufacture of components of a consumer electronic device, wherein the component is a housing, a frame, a clip, a bezel, a bushing, a flange, a strut, a prong, a fin, or a rib. By consumer electronics device (CED) is meant a cellular phone (e.g., a smartphone), a tablet computer, a laptop computer, a portable media player, a television, a portable gaming device, a gaming console, a gaming controller, a remote control, an appliance (e.g. a toaster, a refrigerator, a bread maker, a microwave, a vacuum cleaner, etc.) a power tool (a drill, a blender, etc.), a robot (e.g. an autonomous cleaning robot, a care giving robot, etc.), a toy (e.g. a doll, a figurine, a construction set, a tractor, etc.), a greeting card, a home entertainment system, an active loudspeaker, a soundbar, or the like.

The compositions are also useful in the manufacture of exterior or interior components of automotive, truck, motorcycle, or other vehicles (generically "automotive parts"), including panels, quarter panels, rocker panels, trim fenders, deck lids, trunk fairings and lids, hoods, bumpers, fascia, grilles, mirror housings, cladding, wheel covers, hubcaps, door components, spoilers, instrument panels, instrument panel retainers, interior trim, emblem logos, exterior trim, and door handles, tank flaps, rocker panels, side panels, window frames, head or tail lamps, roof racks, and running boards.

The thermoplastic compositions are further illustrated by the following non-limiting examples.

EXAMPLES

Materials for the following examples are listed in Table 1. Amounts of each component in the Examples and Tables are in wt. %, based on the total weight of the composition, unless otherwise indicated.

TABLE 1

| Component | Chemical/product Description | Source |
|---|---|---|
| PC-Si | PDMS (polydimethylsiloxane) - bisphenol A copolymer, 6 mol % siloxane, having an average block length of 40-50 units, Mw 23,000 g/mol (determined via GPC using polycarbonate standards), manufactured by interfacial polymerization | SABIC |
| PEI | Poly(etherimide) made via reaction of bisphenol-A dianhydride with equimolar amount of m-phenylene diamine, Mw = 31,000 to 35,000 g/mol (determined via GPC using polystyrene standards) | SABIC |
| ITR-PC-Si | Polysiloxane-ITR (Isophthalic acid-terephthalic acid-resorcinol) - bisphenol-A copolyester-carbonate copolymer, ester content 83 mol %, siloxane content 1 wt % (average siloxane chain length about 10), interfacial polymerization, Mw about 24,500 g/mol, para-cumyl phenol end-capped | SABIC |
| Organo-phosphite | Tris(2,4-di-(tert)-butylphenyl)phosphite (IRGAFOS 168) | Ciba |
| UV Absorber | 2,2'-(1,4-phenylene)bis(4H-3,1-benzoxazin-4-one) (Cyasorb UV-3638) | Cytec |
| Whitener | $TiO_2$ (silica alumina coated and passivated with a Si—H siloxane, ~1.0 micron diameter | |
| IM-10 | PMMA over butyl acrylate core-shell acrylic rubber; Paraloid EXL2335 | Dow |
| IM-11 | SEBS rubber; Septon S8104 | Kuraray |
| IM-1 | SEBS with 31.5% S (Kraton G1651) | Kraton |
| IM-2 | Kraton G1654H; (SEBS s/r 31/969, MFI = 0) | Kraton |
| IM-3 | Kraton GA1535H; (SEBS s/r 57/43 MFI = 1) | Kraton |

TABLE 1-continued

| Component | Chemical/product Description | Source |
|---|---|---|
| IM-4 | Kraton G1701M; (SEP, s/r 28/72, MFI = 1) | Kraton |
| IM-5 | Septon S2002; (SEPS 30% S low Mw) | Kuraray |
| IM-6 | Septon S4033; (SEEPS, 30% S low Mw) | Kuraray |
| IM-7 | Septon S4099; (SEEPS, 30% S, high Mw) | Kuraray |
| IM-8 | Septon V9827; (SEBS crosslinkable s) | Kuraray |
| IM-9 | Septon 8004; (SEBS 31% S) | Kuraray |

SEP = styrene-ethylene/propylene
SEPS—styrene-ethylene/propylene-styrene
SEEPS = Styrene-ethylene-ethylene/propylene-styrene The tests performed are summarized in Table 2.

TABLE 2

| Description | Test | Specimen | Property | Units |
|---|---|---|---|---|
| Izod Notched Impact, 5.5 J, various temps. | ISO 180/1A | Multi-purpose ISO 3167 Type A, 3 mm thick | INI 3 mm | kJ/m$^2$ |
| Izod Notched Impact, 5.5 J, various temps. | ISO 180/1A | Multi-purpose ISO 3167 Type A, 4 mm thick | INI 4 mm | kJ/m$^2$ |
| ASTM Izod Notched Impact, various temps. | ASTM D256-2010 | ASTM Impact bar, 3.2 mm thick | ASTM INI | J/m |
| Yield stress retention | ISO 527 | ISO Tensile bar | YS % | % |
| Elongation to break retention | ISO 527 | ISO Tensile bar (5 mm/min cross head speed) | EB % | % |

Chemical resistance tests were performed according to the following protocol. ISO tensile bars were placed in jigs to bring them under 0.5% or 1% strain. While holding two Q-tips together, about 1 ml of chemical is applied to the specimen, where the chemical is spread in a circular motion around the center section and out toward the ends of the specimen until it reaches 25 mm in length. Any extra chemical that is on the sides of the bars is wiped off. Bars in the jigs are left for 24 hrs or 120 hrs at room temperature. After exposure, bars are conditioned for 24 hrs at room temperature and 50% relative humidity, and tested for tensile testing. The retention of yield stress and elongation to break is calculated compared to the reference sample that did not undergo the chemical exposure step.

The tests executed were indicative tests performed according to their respective ISO standards, but, were not executed by an officially certified test institute.

The compositions were made as follows. All solid additives (e.g., stabilizers, colorants) were dry blended off-line as concentrates using one of the primary polymer powders as a carrier and starve-fed via gravimetric feeder(s) into the feed throat of the extruder. The remaining polymer(s) were starve-fed via gravimetric feeder(s) into the feed throat of the extruder as well.

Extrusion of all materials was performed on a 25 mm Werner-Pfleiderer ZAK twin-screw extruder (L/D ratio of 33:1), with a vacuum port located near the die face. The extruder has 9 zones, which were set at temperatures of 40° C. (feed zone), 200° C. (zone 1), 250° C. (zone 2), 280° C. (zone 3), and 290-310° C. (zone 4 to 8). Screw speed was 300 rpm and throughput was between 15 and 25 kg/hr.

The compositions were molded after drying at 100-110° C. for 6 hours on a 45-ton Engel molding machine with 22 mm screw or 75-ton Engel molding machine with 30 mm screw operating at a temperature 270-300° C. with a mold temperature of 70-90° C. It will be recognized by one skilled in the art that the method is not limited to these temperatures or processing equipment.

STEM images were obtained using a Zeiss Supra 40 VP instruments in STEM mode at HV and 30 kV. Samples were stained with $OsO_4$ and $RuO_4$.

Examples 1-12 compare the impact properties and chemical resistance of compositions containing a core-shell acrylic rubber (i.e. first impact modifier) and a SEBS rubber (i.e. second impact modifier) in a combination, polyetherimide; a poly(carbonate-siloxane), and a compatibilizer (Example 12) with identical control formulations except for the presence of the combination of a first and second impact modifier (CEX 1-11). Formulations and results are shown in Table 3.

TABLE 3

| Components | CEX1 | CEX2 | CEX3 | CEX4 | CEX5 | CEX6 | CEX7 | CEX8 | CEX9 | CEX10 | CEX11 | EX12 |
|---|---|---|---|---|---|---|---|---|---|---|---|---|
| PEI | 21.1 | 20.6 | 20.6 | 20.6 | 20.6 | 20.6 | 20.6 | 20.6 | 20.6 | 20.6 | 20.6 | 20.6 |
| PC-Si | 49.90 | 48.7 | 48.7 | 48.7 | 48.7 | 48.7 | 48.7 | 48.7 | 48.7 | 48.7 | 48.7 | 48.7 |
| ITR-PC-Si | 11.40 | 11.1 | 11.1 | 11.1 | 11.1 | 11.1 | 11.1 | 11.1 | 11.1 | 11.1 | 11.1 | 11.1 |
| Organophosphite | 0.10 | 0.1 | 0.1 | 0.1 | 0.1 | 0.1 | 0.1 | 0.1 | 0.1 | 0.1 | 0.1 | 0.1 |
| UV Absorber | 1.5 | 1.5 | 1.5 | 1.5 | 1.5 | 1.5 | 1.5 | 1.5 | 1.5 | 1.5 | 1.5 | 1.5 |
| IM-1 | | 10 | | | | | | | | | | |
| IM-2 | | | 10 | | | | | | | | | |
| IM-3 | | | | 10 | | | | | | | | |
| IM-4 | | | | | 10 | | | | | | | |
| IM-5 | | | | | | 10 | | | | | | |
| IM-6 | | | | | | | 10 | | | | | |
| IM-7 | | | | | | | | 10 | | | | |
| IM-11 | | | | | | | | | 10 | | | 5 |
| IM-8 | | | | | | | | | | 10 | | |
| IM-9 | | | | | | | | | | | 10 | |
| IM-10 | 8 | | | | | | | | | | | 5 |
| Whitener | 8.0 | 8.0 | 8.0 | 8.0 | 8.0 | 8.0 | 8.0 | 8.0 | 8.0 | 8.0 | 8.0 | 8.0% |
| Total (%) | 100 | 100 | 100 | 100 | 100 | 100 | 100 | 100 | 100 | 100 | 100 | 100 |
| Tensile Strength at Break (MPA) | 50 | 53 | 54 | 47 | 11 | 12 | 20 | 53 | 59 | 11 | 18 | 61 |
| % Elongation at Break | 84 | 91.44 | 93.79 | 95.78 | 36.05 | 81.72 | 122.3 | 93.85 | 127.4 | 59.87 | 90.2 | 109 |
| Impact Strength-Avg (J/m) | 839 | 809 | 599 | 436 | 854 | 301 | 854 | 311 | 670 | 775 | 838 | 863 |
| Sunscreen testing at 1% strain and 65° C. (%) | 0 | 43 | 13 | 97 | 92 | 103 | 0 | 15 | 101 | 88 | 95 | 97 |

As these results show, a combination of at least two impact modifiers, i.e., a core-shell acrylic rubber and a SEBS rubber, provides superior impact resistance, tensile strength, elongation and chemical resistance to sunscreen (Example 12). Further advantageously, as the Microscopy results illustrate at FIG. 1, STEM morphology indicates good interfacial interaction between the SEBS rubber and the core-shell acrylic rubber. The contiguous but phase separated morphology gives rise to a synergistic effect, resulting in improved impact resistance as well as good chemical resistance.

Set forth below are specific embodiments of the disclosure.

Embodiment 1

A thermoplastic composition comprising, based on the total weight of the thermoplastic composition, 3 to 20 wt. % of an impact modifier composition comprising a first impact modifier and a second impact modifier, preferably a core-shell acrylic rubber and a styrene-ethylene-butylene-styrene rubber; 15 to 50 wt. % of a poly(etherimide); 5 to 60 wt. % of a polycarbonate, preferably a poly(carbonate-siloxane); 5 to 20 wt. % of compatibilizer component comprising a poly(carbonate-arylate ester); up to 15 wt. % of an ultraviolet light absorbing additive; 0 to 20 wt. % of $TiO_2$; and 0.01 to 0.5 wt. %, of an organophosphite; wherein a sample of the composition has a notched Izod impact energy of at least 200 J/m at 23° C. measured in accordance to ASTM D256, optionally, a yield stress retention of 80% and higher after exposure of an ISO tensile bar for 24 hours to sunscreen at a temperature of 23° C. to 80° C. under 0.5% or 1% strain compared to a non-exposed reference tested according to ISO 527 at the same temperature, and optionally, an elongation at break retention of 75% and higher after exposure of an ISO tensile bar for 24 hours to sunscreen at a temperature of 23° C. to 80° C. under 0.5% or 1% strain compared to a non-exposed reference tested according to ISO 527 at the same temperature.

Embodiment 2

The composition of Embodiment 1, comprising 3 to 17 wt. % of the first impact modifier, preferably the core-shell acrylic rubber and 2 to 17 wt. % of the second impact modifier, preferably the styrene-ethylene-butylene-styrene rubber; more preferably comprising 4 to 10 wt. % of the core-shell acrylic rubber and 2 to 6 wt. % of the styrene-ethylene-butylene-styrene rubber.

Embodiment 3

The composition of any one or more of Embodiments 1 to 2, comprising 5 to 15 wt. % of the impact modifier composition, preferably 5 to 12 wt. %, based on total weight of the thermoplastic composition.

Embodiment 4

The composition of any one or more of Embodiments 1 to 3, wherein a weight ratio of the first impact modifier to the second impact modifier, preferably the core-shell acrylic rubber to SEBS rubber, is 1:3 to 3:1.

Embodiment 5

The composition of any one or more of Embodiments 1 to 4, wherein the core-shell acrylic rubber comprises 3 to 10 wt. % of a poly(methyl methacrylate) shell and 80 to 97 wt. % of a poly(butyl acrylate) core, based on total weight of the rubber; and the styrene-ethylene-butylene-styrene rubber comprises less than 5 wt. % olefinic unsaturation and less than 50 wt. % of styrene.

Embodiment 6

The composition of any one or more of Embodiments 1 to 5, further comprising 0.5 to 10 wt. % of a poly(etherimide-siloxane) copolymer.

Embodiment 7

The composition of any one or more of Embodiments 1 to 5 wherein the poly(carbonate-arylate ester) is a poly(bisphenol A carbonate)-co-(bisphenol phthalate ester) comprising 55 to 65 wt. % of the ester units, wherein the ester units have a molar ratio of isophthalate to terephthalate of 45:55 to 55:45 or the poly(carbonate-arylate ester) is a poly(bisphenol A carbonate)-co-(bisphenol phthalate ester) comprising 75 to 85 wt. % of the ester units, wherein the ester units have a molar ratio of isophthalate to terephthalate of 98:2 to 50:50.

Embodiment 8

The composition of any one or more of Embodiments 1 to 5 wherein the poly(carbonate-arylate ester) comprises 70 to 90 mol % of bisphenol A carbonate units, 10 to 30 mol % of isophthalic acid-terephthalic acid-resorcinol ester units, and optionally, 1 to 60 mol % resorcinol carbonate units, resorcinol ester units, isophthalic acid-terephthalic acid-bisphenol A ester units, or a combination thereof.

Embodiment 9

The composition of any one or more of Embodiments 1 to 5 wherein the poly(carbonate-arylate ester) comprises 1 to 20 mol % of bisphenol A carbonate units, 60 to 99 mol % of isophthalic acid-terephthalic acid-resorcinol ester units, and optionally, 1 to 20 mol % resorcinol carbonate units, resorcinol ester units, isophthalic acid-terephthalic acid-bisphenol A ester units, or a combination thereof.

Embodiment 10

The composition of any one or more of Embodiments 1 to 5, wherein the poly(carbonate-monoaryl arylate ester) comprises, bisphenol A carbonate units; isophthalic acid-terephthalic acid-resorcinol units; and siloxane units of the formula (9b), (9c), (9d), or a combination comprising at least one of the foregoing, wherein E has an average value of 5 to 30.

Embodiment 11

The composition of any one or more of Embodiments 1 to 10, further comprising an additive selected from a processing aid, mold release agent, a lubricant, a heat stabilizer, an ultraviolet light stabilizer, a colorant, a flame retardant that is an organic compound containing at least 30 carbon atoms and having a molecular weight of greater than or equal to 400 Daltons, an inorganic filler, preferably a clay, or a combination comprising at least one of the foregoing.

Embodiment 12

The composition of any one or more of Embodiments 1 to 11, wherein the composition comprises 0.5 to 15 wt. %, preferably 3 to 15 wt. %, of titanium dioxide.

Embodiment 13

The composition of any one or more of Embodiments 1 to 12, wherein the composition comprises 0.0001 to 15 wt. % of the ultraviolet light absorbing additive, based on the total weight of the composition, preferably wherein the ultraviolet light absorbing additive comprises 2,2'-(1,4-phenylene) bis(4H-3,1-benzoxazin-4-one) and the organophosphite comprises tris (2,4-di-tert-butyl)phenyl phosphite.

Embodiment 14

The composition of any one or more of Embodiments 1 to 13, having a lower delta E than the same composition without the compatibilizer after ultraviolet aging.

Embodiment 15

The composition of any one or more of Embodiments 1 to 14, further comprising a reinforcing agent, wherein optionally the reinforcing agent comprises glass fibers, preferably in an amount from 1 to 200 parts by weight based on 100 parts by weight of the polymers, wherein the glass fibers have a round or flat cross-section.

Embodiment 16

An article selected from a molded article, a thermoformed article, an extruded sheet, an extruded fiber or filament, a foamed article, one or more layers of a multi-layer article, a substrate for a coated article, a printed article, and a substrate for a metallized article comprising the composition of any one or more of Embodiments 1 to 15.

Embodiment 17

The article of Embodiment 16 further comprising a metal deposited on a surface of the article, preferably wherein the metal is anodized.

Embodiment 18

The article of any one or more of Embodiments 16 to 17, wherein the article is a component of a consumer electronic device selected from a gaming console, a gaming controller, a portable gaming device, a cellular telephone, a television, a personal computer, a tablet computer, a laptop computer, a personal digital assistant, a portable media player, a, a digital camera, a portable music player, an appliance, a power tool, a robot, a toy, a greeting card, a home entertainment system, and active loudspeaker, or a soundbar.

Embodiment 19

The article of any one or more of Embodiments 16 to 17, wherein the article is an automotive component selected from panels, quarter panels, rocker panels, trim fenders, deck lids, trunk fairings and lids, hoods, bumpers, fascia, grilles, mirror housings, cladding, wheel covers, hubcaps, door components, spoilers, instrument panels, instrument panel retainers, interior trim, emblem logos, exterior trim, and door handles, tank flaps, rocker panels, side panels, window frames, head or tail lamps, roof racks, or running boards.

Embodiment 20

A method of manufacture of an article, comprising molding, extruding, 3-dimensional printing, or casting the composition of any one or more of Embodiments 1 to 15 to form the article.

The singular forms "a," "an," and "the" include plural referents unless the context clearly dictates otherwise. "Or" means "and/or." The endpoints of all ranges directed to the same component or property are inclusive and independently combinable. Unless defined otherwise, technical and scientific terms used herein have the same meaning as is commonly understood by one of skill in the art to which this invention belongs.

As used herein, a "combination" is inclusive of blends, mixtures, alloys, reaction products, and the like. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Unless otherwise indicated, exemplary groups that can be present on a "substituted" position include cyano; hydroxyl; nitro; alkanoyl (such as a $C_{2-6}$ alkanoyl group such as acyl); carboxamido; $C_{1-6}$ or $C_{1-3}$ alkyl, cycloalkyl, alkenyl, and alkynyl; $C_{1-6}$ or $C_{1-3}$ alkoxy; $C_{6-10}$ aryloxy such as phenoxy; $C_{1-6}$ alkylthio; $C_{1-6}$ or $C_{1-3}$ alkylsulfinyl; C1-6 or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

All references cited herein are incorporated by reference in their entirety.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A thermoplastic composition comprising, based on the total weight of the thermoplastic composition,
   5 to 20 wt. % of an impact modifier composition comprising a first core-shell acrylic rubber impact modifier and a second styrene-ethylene-butylene-styrene impact modifier;
   20 to 50 wt. % of a poly(etherimide);
   10 to 60 wt. % of a polymer selected from the group consisting of polycarbonates, copolycarbonates, poly(carbonate-siloxanes) and combinations thereof;
   5 to 20 wt. % of compatibilizer component comprising one or more resorcinol based poly(carbonate-arylate esters);
   up to 15 wt. % of an ultraviolet light absorbing additive;
   0 to 15 wt. % of $TiO_2$; and
   0.01 to 0.5 wt. %, of an organophosphite;
wherein a sample of the composition has
   a notched Izod impact energy of at least 200 J/m at 23° C. measured in accordance to ASTM D256,
   a yield stress retention of 80% and higher after exposure of an ISO tensile bar for 24 hours to sunscreen at a temperature of 23° C. to 80° C. under 0.5% or 1% strain compared to a non-exposed reference tested according to ISO 527 at the same temperature, and
   an elongation at break retention of 75% and higher after exposure of an ISO tensile bar for 24 hours to sunscreen at a temperature of 23° C. to 80° C. under 0.5% or 1% strain compared to a non-exposed reference tested according to ISO 527 at the same temperature.

2. The composition of claim 1, comprising 3 to 17 wt. % of the first core-shell acrylic rubber impact modifier and 2 to 17 wt. % of the second styrene-ethylene-butylene-styrene impact modifier.

3. The composition of claim 1, comprising 5 to 15 wt. % of the impact modifier composition, based on total weight of the thermoplastic composition.

4. The composition of claim 1, wherein a weight ratio of the first core-shell acrylic rubber impact modifier to the second styrene-ethylene-butylene-styrene impact modifier is 1:3 to 3:1.

5. The composition of claim 1, wherein
   the first core-shell acrylic rubber impact modifier comprises 3 to 10 wt. % of a poly(methyl methacrylate) shell and 80 to 97 wt. % of a poly(butyl acrylate) core, based on total weight of the rubber; and
   the second styrene-ethylene-butylene-styrene impact modifier comprises less than 5 wt. % olefinic unsaturation.

6. The composition of claim 1, further comprising 0.5 to 10 wt. % of a poly(etherimide-siloxane) copolymer.

7. The composition of claim 1 wherein the poly(carbonate-arylate ester) comprises
   70 to 90 mol % of bisphenol A carbonate units and
   10 to 30 mol % of isophthalic acid-terephthalic acid-resorcinol ester units.

8. The composition of claim 1, wherein the poly(carbonate-arylate ester) comprises,
   bisphenol A carbonate units;
   isophthalic acid-terephthalic acid-resorcinol ester units; and
   siloxane units of the formula

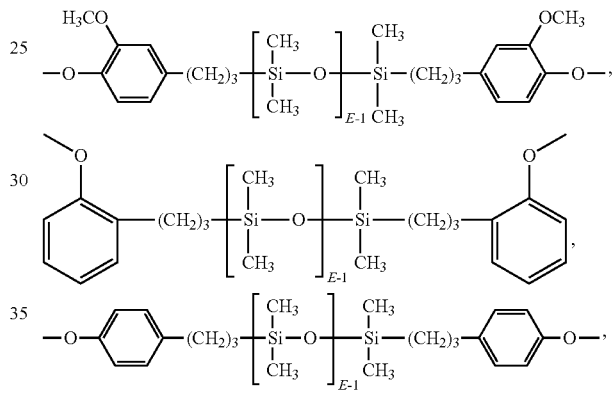

or a combination comprising at least one of the foregoing, wherein E has an average value of 5 to 30.

9. The composition of claim 1, further comprising an additive selected from a processing aid, a mold release agent, a lubricant, a heat stabilizer, an ultraviolet light stabilizer, a colorant, a flame retardant that is an organic compound containing at least 30 carbon atoms and having a molecular weight of greater than or equal to 400 Daltons, an inorganic filler, or a combination comprising at least one of the foregoing.

10. The composition of claim 1, wherein the composition comprises 0.5 to 15 wt. % of titanium dioxide, based on the total weight of the composition.

11. The composition of claim 1, wherein the composition comprises 0.0001 to 15 wt. % of the ultraviolet light absorbing additive, based on the total weight of the composition.

12. The composition of claim 1, having a lower delta E than the same composition without the compatibilizer after ultraviolet aging.

13. The composition of claim 1, further comprising a reinforcing agent.

14. An article selected from a molded article, a thermoformed article, an extruded sheet, an extruded fiber or filament, a foamed article, one or more layers of a multilayer article, a substrate for a coated article, a printed article, and a substrate for a metallized article comprising the composition of claim 1.

15. The article of claim 14 further comprising a metal deposited on a surface of the article, wherein the metal is anodized.

16. The article of claim 14, wherein the article is a component of a consumer electronic device selected from a gaming console, a gaming controller, a portable gaming device, a cellular telephone, a television, a personal computer, a tablet computer, a laptop computer, a personal digital assistant, a portable media player, a digital camera, a portable music player, an appliance, a power tool, a robot, a toy, a greeting card, a home entertainment system, and active loudspeaker, or a soundbar.

17. The article of claim 14, wherein the article is an automotive component selected from panels, quarter panels, rocker panels, trim fenders, deck lids, trunk fairings and lids, hoods, bumpers, fascia, grilles, mirror housings, cladding, wheel covers, hubcaps, door components, spoilers, instrument panels, instrument panel retainers, interior trim, emblem logos, exterior trim, and door handles, tank flaps, rocker panels, side panels, window frames, head or tail lamps, roof racks, or running boards.

18. A method of manufacture of an article, comprising molding, extruding, three-dimensional printing, or casting the composition of claim 1 to form the article.

19. The thermoplastic composition of claim 1, wherein the poly(carbonate-arylate ester) comprises 1 to 20 mol % of bisphenol-A carbonate units and 60 to 90 mole % of the isophthalic acid-terephthalic acid-resorcinol ester units.

20. The thermoplastic composition of claim 19, wherein the poly(carbonate-arylate ester) further comprises 0.1 to 10 wt. % of the siloxane units based on the total poly(carbonate-arylate ester).

* * * * *